US006068751A

United States Patent [19]

Neukermans

[11] Patent Number: 6,068,751

[45] Date of Patent: May 30, 2000

[54] MICROFLUIDIC VALVE AND INTEGRATED MICROFLUIDIC SYSTEM

[76] Inventor: Armand P. Neukermans, 3510 Arbutus Ave., Palo Alto, Calif. 94303

[21] Appl. No.: 08/768,303

[22] Filed: Dec. 17, 1996

Related U.S. Application Data

[60] Provisional application No. 60/088,832, Dec. 18, 1995.

[51] Int. Cl.[7] .................... G01N 27/26

[52] U.S. Cl. .................... 204/601; 204/604; 137/606; 251/7; 251/129.06; 251/213

[58] Field of Search .................... 137/606; 251/129.06, 251/7, 213; 204/601, 604

[56] References Cited

U.S. PATENT DOCUMENTS

| | | | |
|---|---|---|---|
| 4,522,622 | 6/1985 | Peery et al. | 604/191 |
| 4,529,102 | 7/1985 | Quinn et al. | 222/94 |
| 4,541,429 | 9/1985 | Prosl et al. | 604/249 |
| 4,721,095 | 1/1988 | Rey et al. | 128/1 R |
| 4,787,071 | 11/1988 | Kreuter et al. | 367/140 |
| 4,991,628 | 2/1991 | Makela et al. | 137/884 |
| 5,197,708 | 3/1993 | Camapu | 251/8 |
| 5,222,713 | 6/1993 | Lawless et al. | 251/129.06 |
| 5,224,843 | 7/1993 | Van Lintel | 417/413 A |
| 5,527,288 | 6/1996 | Gross et al. | 604/140 |
| 5,705,070 | 1/1998 | Saaski et al. | 210/446 |

FOREIGN PATENT DOCUMENTS

| | | | |
|---|---|---|---|
| 0450736 | 10/1991 | European Pat. Off. | A61M 5/142 |
| 2630180 | 10/1989 | France | F16K 7/04 |
| 0932736 | 7/1963 | United Kingdom . | |
| 2221014 | 1/1990 | United Kingdom . | |

*Primary Examiner*—David A. Redding
*Attorney, Agent, or Firm*—Donald E. Schreiber

[57] ABSTRACT

A microfluidic delivery system (20) and microfluidic system (100) control flows of a liquid or a gas through elongated capillaries (62, 126) that are enclosed along at least one surface by a layer (42, 114) of a malleable material. An electrically-powered actuator included in the systems (20, 100) extends toward or retracts a blade from the layer (42, 114) of a malleable material to either occlude or open capillaries. Reservoirs (46, 124) included in a pouch (22, 108) together with the capillaries (62, 126) supply fluids whose flow is controlled by movement of the blades. The microfluidic system (100) permits dispensing at will, under microprocessor control at predetermined flow rates, liquids, samples, chemicals, reagents and body fluids, and mixing them together and/or reacting for diagnostic medical or analytical tests, DNA sequencing etc. The microfluidic delivery system (20) and microfluidic system (100) may be used for clinical testing, environmental or forensic testing, analytical chemistry, fine chemistry, biological sciences, combinatorial synthesis, etc.

32 Claims, 11 Drawing Sheets

MICROFLUIDIC VALVE AND INTEGRATED MICROFLUIDIC SYSTEM

CLAIM OF PROVISIONAL APPLICATION RIGHTS

This application claims the benefit of United States Provisional Patent Application No. 60/088,832 filed on Dec. 18, 1995.

BACKGROUND OF THE INVENTION

1. Field of the Invention

The present invention relates generally to regulating delivery of minute quantities of liquids, and more specifically to microfluidic systems particularly for analytical instruments such as those used for DNA or peptide sequencing and medical or clinical diagnostics.

2. Description of the Prior Art

Various efforts are underway to build miniature valves and pumps in silicon for micro-fluidics. It is however proving to be difficult to produce good sealing surfaces in silicon, and it turns out that these valves, although in principle mass-produced on a silicon wafer, become expensive in their packaged finished form. Consequently, such micro-fluidic components can hardly be considered inexpensive and/or disposable. Moreover, in such micro-fluidic components liquid contacts the valve and pump bodies and passages, thereby creating a contamination problem if the micro-fluidic component is to be reused. In addition, these micro-fluidic valves still must be interconnected into systems, and such interconnection also becomes expensive.

This interest in micro-fluidic components has been spurred largely by the rapid developments in the medical and biological sciences and related fields. In many such applications, small amounts of liquids need to be dispensed, samples need to be introduced and mixed in a given sequence with a variety of reagents, and the reagent products need to be examined for the presence or absence of particular species. In addition, obtaining good analytic results often requires that the dead volume associated with valving and tubing be extremely small.

Examples of processes which would benefit from a microfluidic system are immunoassay tests, or DNA tests for forensic applications, infectious or genetic diseases or screening for genetic defects. These tests often involve the polymerase chain reaction ("PCR") which is used to multiply strands of DNA many fold thereby obtaining sufficient material for standard analytic techniques. For many clinical applications, it is highly desirable to perform tests in a doctor's office rather than at a remote laboratory, thereby saving the costs and time of sample preservation, contamination and transportation. Hence portable, small, fully integrated systems, capable of performing these complex tests are highly desirable.

For these types of analytic systems, it is often desirable to incorporate some of the reagent liquids into the system thereby reducing local operations, and to guarantee that the reagents have the same quality as originally provided by their manufacturer. In many cases, it is desirable that the unit be completely automated, and that only the sample liquid need be introduced into the system. It is also often advantageous to perform a battery of tests on the same sample, either simultaneously or sequentially.

In the case of analytical instrumentation, large quantities of liquids may be required, more than can be conveniently stored in a micro-fluidic system. However, it is still highly desirable under such circumstances that the complex array of interconnections of very small tubes, valves etc. be replaced by an integrated system which is much less prone to leakage, dead-space and contamination, and that costs substantially less.

Presently, an area of materials research identified as combinatorial synthesis seeks to synthesize as possible pharmaceuticals "polymeric" materials that consist of an arbitrary, but pre-specified sequence, assembled from different monomeric starting materials. Extending the concept of the four DNA base pairs that make up genetic material and the twenty amino acids that make up all proteins, this area of chemical synthesis seeks to synthesize such polymeric materials, one monomeric unit at a time, an chain of monomeric units chosen arbitrarily from as many as two hundred different monomers. It is readily apparent that assembling a system to perform combinatorial synthesis using conventional laboratory apparatus is a herculean task.

SUMMARY OF THE INVENTION

An object of the present invention is to provide a simple microfluidic valve that is inexpensive, fast, and non-contaminating, and that can be used as building block in assembling much more complex microfluidic systems.

Another object of the present invention is to provide a microfluidic valve that has an extremely low dead volume.

Another object of the present invention to provide an inexpensive microfluidic liquid delivery system capable of pipetting microliter quantities of liquids.

Another object of the present invention to provide a microfluidic circuit, where all liquid passages, valve seats, reaction and mixing chambers are simply integrated into an inexpensive container.

Another object of the present invention is to provide a microfluidic system that may be easily connected to large liquid reservoirs that are external to the microfluidic system.

Another object of the present invention is to provide a microfluidic system in which an actuator portion of valves do not become contaminated during system operation.

Another object of the present invention is to provide a microfluidic system in which a container for the liquids may be disposable, but an actuator portion of valves are reusable without cleaning.

Another object of the present invention to provide a microfluidic system that integrates in a single container all liquid passages, reservoirs, reaction chambers, heaters, electrodes, detectors and/or access ports for process monitoring.

Another object of the present invention is to provide a self-contained unit which may be disposable in many diagnostic or analytical applications, reusing all expensive hardware without need for cleaning.

It is further an object of this invention to provide a modular microfluidic system that permits quickly interchanging valves and other associated components to produce different system configurations for performing different processes.

Briefly, in a first embodiment the present invention is a microfluidic valve for controlling a flow of a liquid through an elongated capillary that is enclosed along at least one surface by a layer of a malleable material. The microfluidic valve includes a valve housing adapted to be pressed firmly against the layer of malleable material. The microfluidic valve also includes an electrically-powered actuator secured within the valve housing which, upon application of an electrical signal to the electrically-powered actuator, extends toward or retracts from the layer of malleable material. A blade, also included in the microfluidic valve, is coupled to the electrically-powered actuator and shaped so that extension of the electrically-powered actuator toward the layer of malleable material presses the blade against the layer of malleable material. Pressing of the blade against the layer of malleable material occludes the capillary and bars any liquid from flowing from an inlet port of the capillary to an outlet port. Upon retraction of the blade from the layer of malleable material, liquid introduced into the inlet port of the capillary may flow through the capillary to exit the capillary through the outlet port.

The microfluidic valve is particularly adapted for use with a pouch that includes a layer of malleable material. The pouch includes a reservoir that is adapted for holding a quantity of liquid. The pouch preferably includes a substantially planar, elongated, paddle-shaped nozzle that projects outward from the reservoir and is adapted to be juxtaposed with an anvil surface of a base plate that is preferably included in the microfluidic valve. Disposed in this position, the nozzle is interposed between the blade of the valve housing and the anvil surface. The nozzle also preferably includes a registration aperture that mates with and engages a registration pin that projects from the base plate of the microfluidic valve. Formed within the nozzle is the elongated capillary that is occluded by the blade of the microfluidic valve. The capillary's inlet port communicates directly with the reservoir, and the capillary is disposed between the blade and the anvil surface when the registration aperture of the nozzle mates with and engages the base plate's registration pin. The capillary's outlet port is located distal from the reservoir, whereby, upon retracting the blade of the valve housing from the base plate's anvil surface, pressure applied to the reservoir urges the liquid to flow out of the pouch along the capillary and through the outlet port.

The simple, planar valving concept described above for the liquid delivery system can be used as a component in assembling much more complex microfluidic systems which also form part of the present invention. The valving concept described above for the liquid delivery system can be analogized to a planar transistor that permits assembling micro microfluidic systems being analogized to integrated circuits. As used in integrated circuits, the planar process, originally developed for fabricating individual transistors, replaces a collection of individual discrete transistors with devices integrated into a single, complex, monolithic device. These integrated transistors, formed with diffusions and oxidations, and inter connected by electrically conductive leads, can be regarded as valves for electrical currents, all of which are concurrently formed during processing of a single silicon wafer substrate. An analogous principal may be applied to the planar valving concept described above for the liquid delivery system. The single valve and reservoir concept can be extended to multiple reservoirs, which can be connected through capillaries and valves, and all of which are formed in a single integrated assembly.

Accordingly, the present invention also includes a microfluidic system for controlling flows of a liquid through a plurality of interconnected, elongated capillaries that are all enclosed along at least one surface by a layer of a malleable material. The microfluidic system includes a plurality of valve housings adapted to be pressed firmly against the layer of malleable material. Each valve housing includes an electrically-powered actuator which, upon application of an electrical signal, extends toward or retracts from the layer of malleable material. Each electrically-powered actuator is coupled to a blade that is shaped so extension of the electrically-powered actuator toward the layer of malleable material juxtaposes the blade with one of the capillaries, and presses the blade against the layer of malleable material. Pressing of the blade against the layer of malleable material occludes the capillary and bars liquid from flowing from the capillary's inlet port to its outlet port. Upon retraction of the blade from the layer of malleable material, liquid introduced into the capillary's inlet port may flow through the capillary to exit the capillary's outlet port.

The microfluidic system is particularly adapted for use with pouch that includes a layer of malleable material that has a plurality of liquid filled reservoirs. The pouch has a substantially planar surface that is adapted to be juxtaposed with an anvil surface of a base plate that is preferably included in the microfluidic system. Disposed in this position, capillaries are interposed between the blades of the valve housings and the anvil surface. The pouch also preferably includes a reaction chamber into which liquid may admitted from the reservoirs under the control of the microfluidic system's valves. Provisions are made for heating and cooling the reaction chamber, and for applying various diagnostic techniques to monitor liquids flowing through the capillaries.

In general, the present invention is useful in all applications where small quantities of liquids need to be dispensed, mixed, reacted, possibly heated or cooled, and the reaction products inspected. Such applications occur in clinical and diagnostic testing, environmental or forensic testing, analytical chemistry. fine chemistry, biological sciences, combinatorial synthesis, etc. A microfluidic system in accordance with the present invention simplifies, if not eliminates, the nest of tubes and valves, usually associated with present liquid delivery systems capable of performing such processes. Moreover, the present microfluidic system may provide all of these features in a compact, portable device.

These and other features, objects and advantages will be understood or apparent to those of ordinary skill in the art from the following detailed description of the preferred embodiment as illustrated in the various drawing figures.

Figure 7:
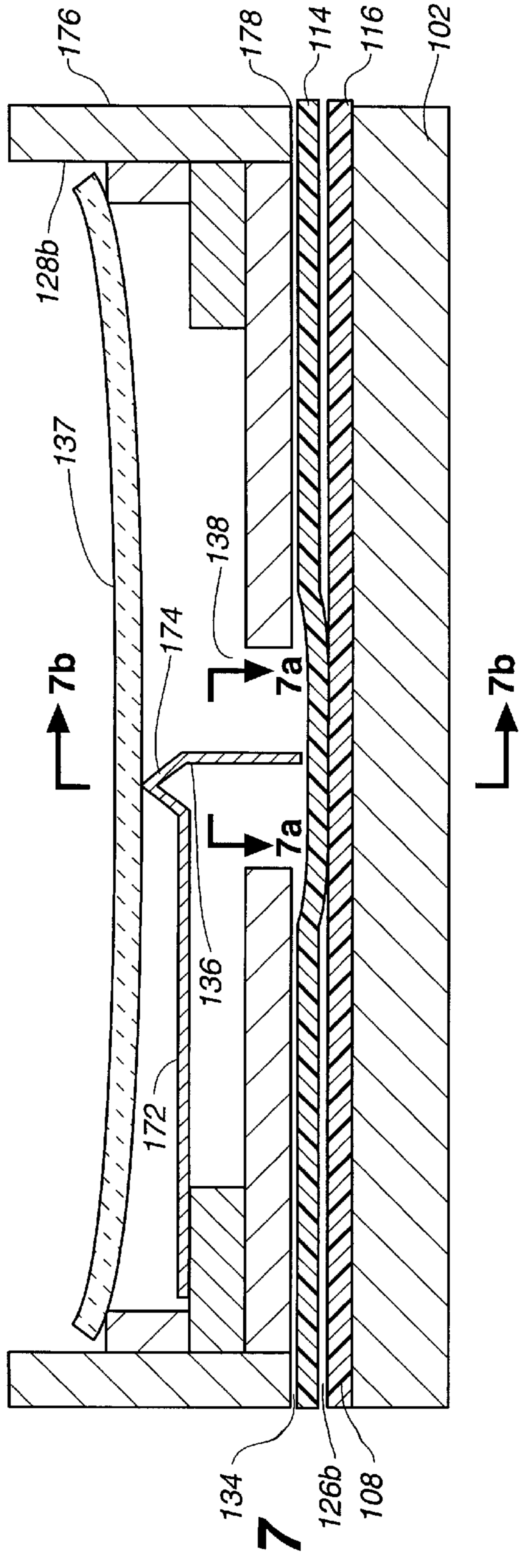
FIG. 7 is a cross-sectional view of a preferred embodiment of a valve included in the microfluidic system taken along the line 7—7 in FIG. 3.
Figure 8:
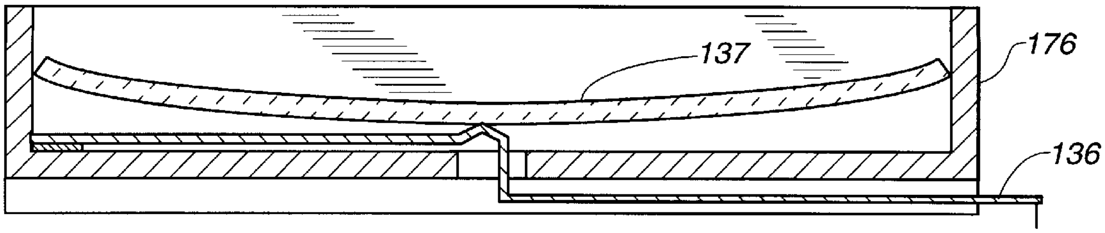
Figure 9:
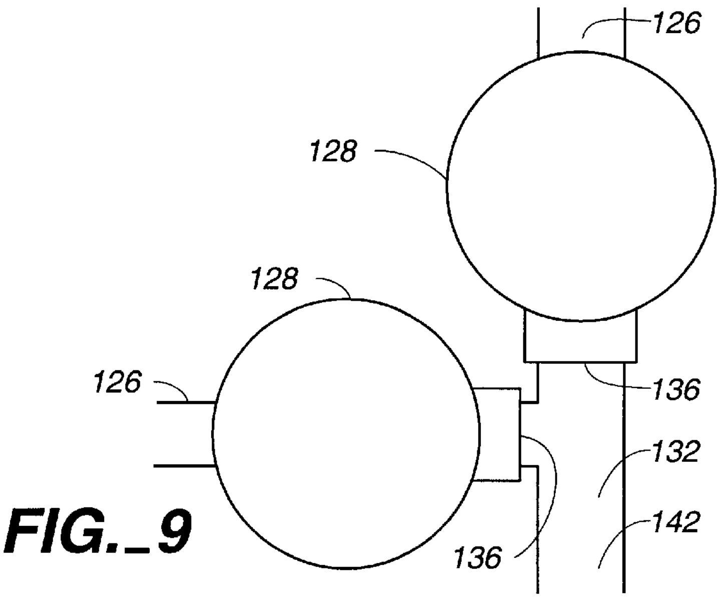
Figure 12:
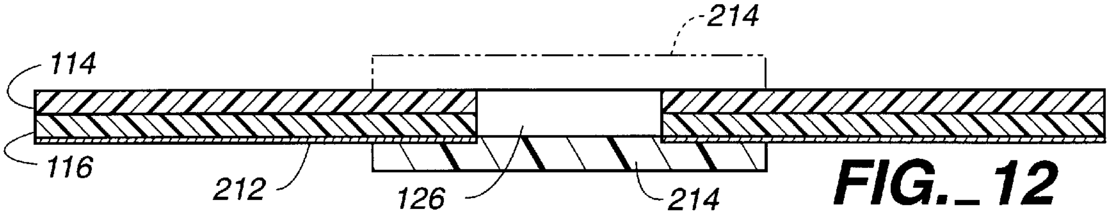
Figure 13:
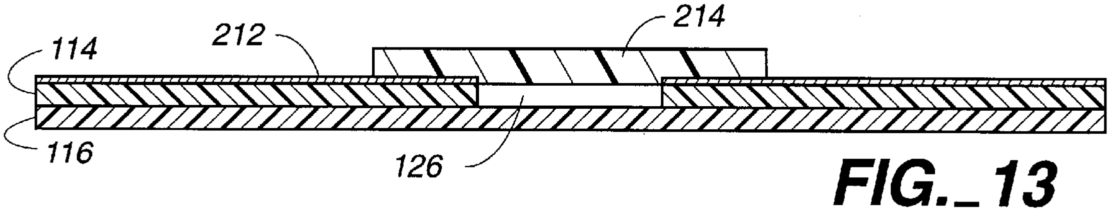
Figure 10A:
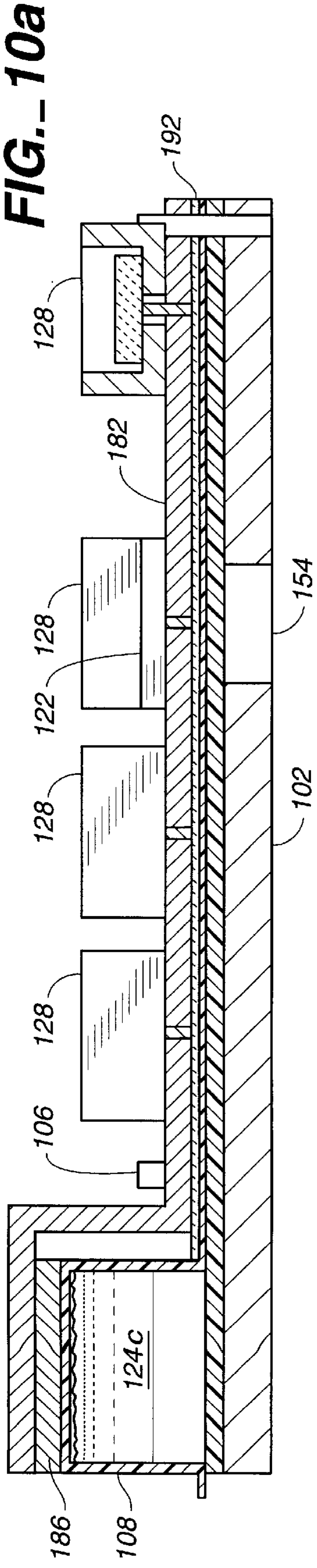
Figure 10:
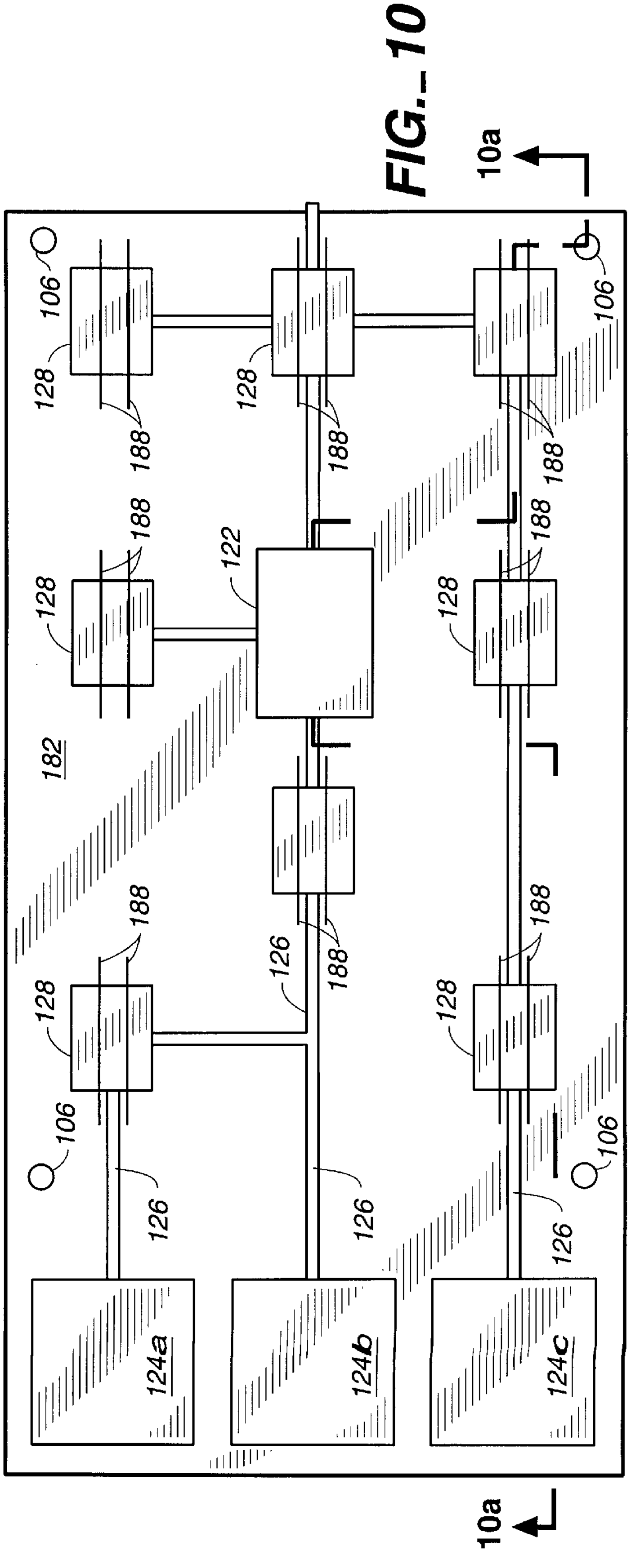
Figure 11:
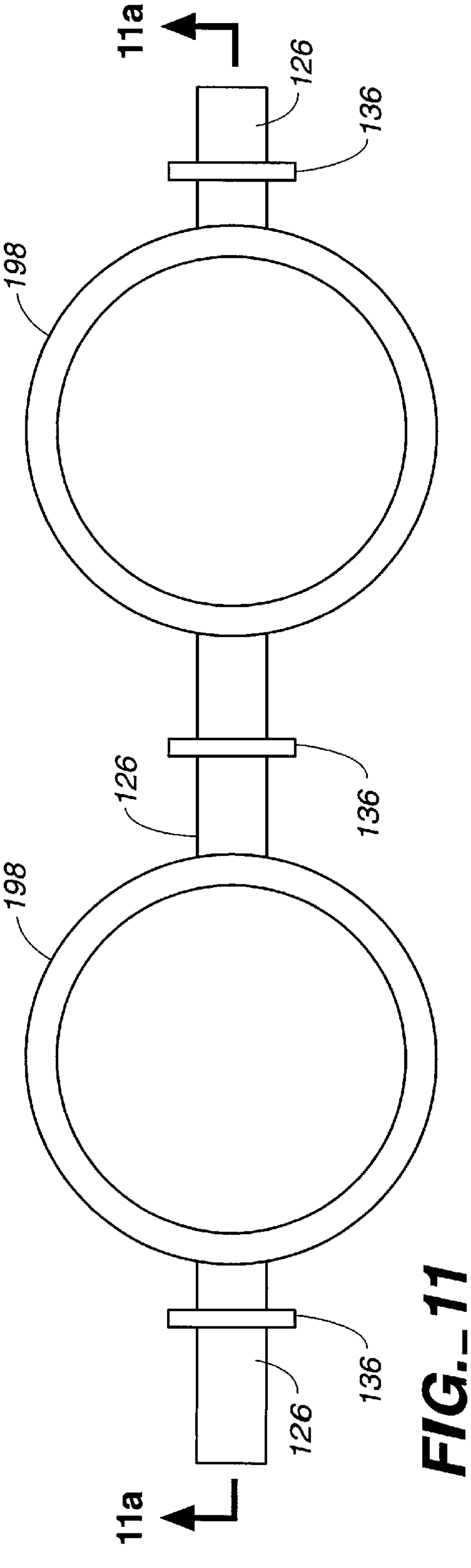
Figure 11A:
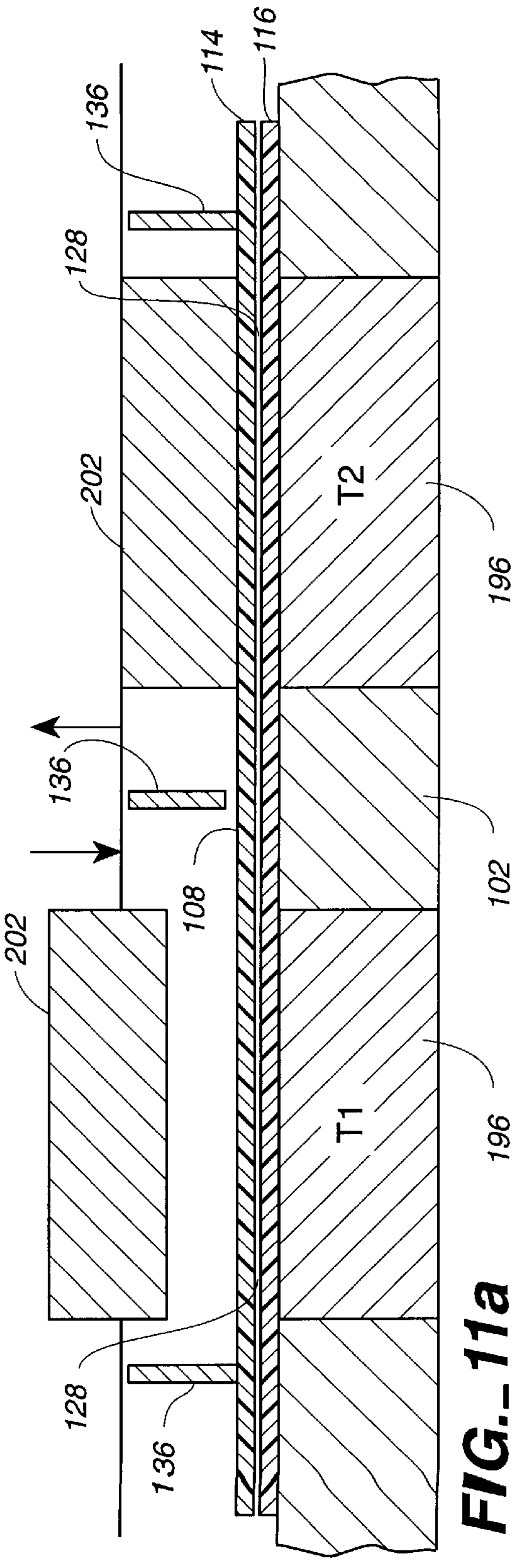
Figure 14:
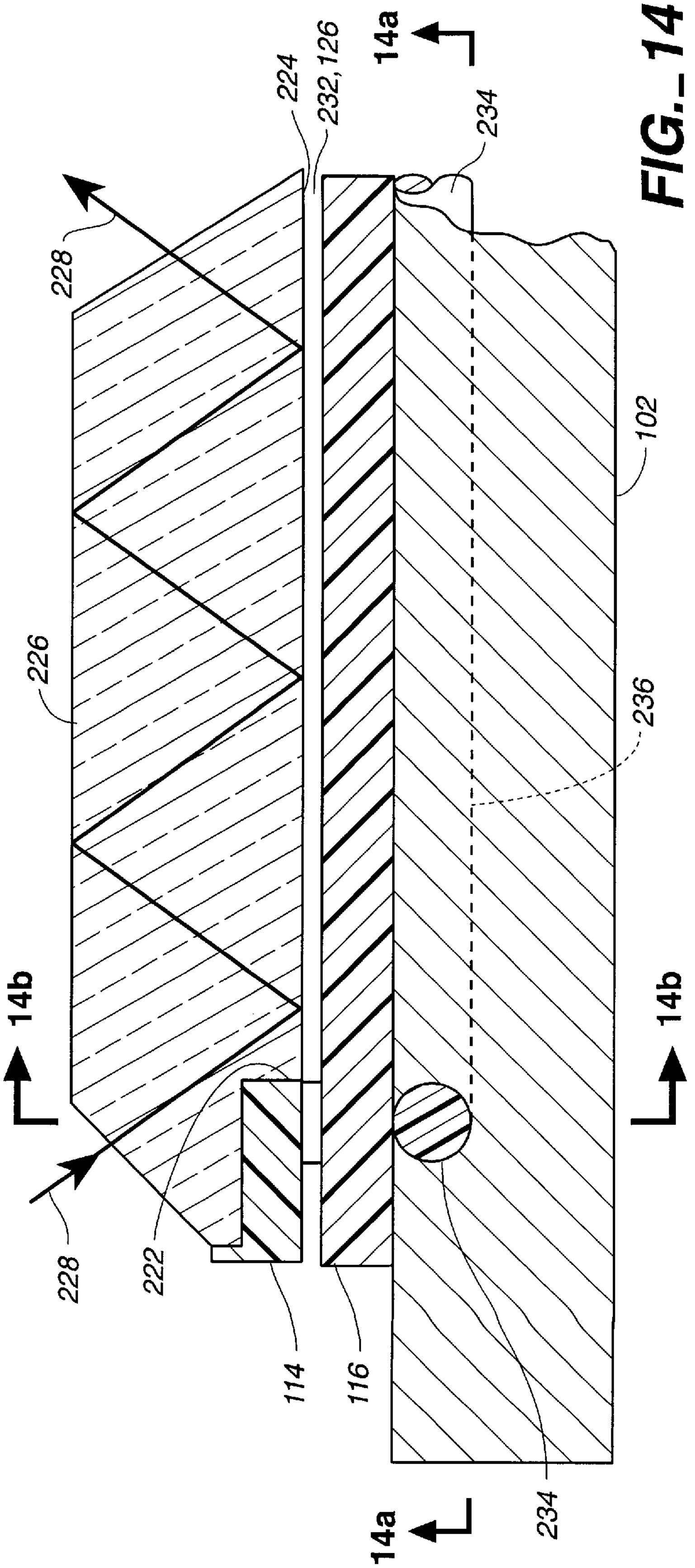
Figure 14A:
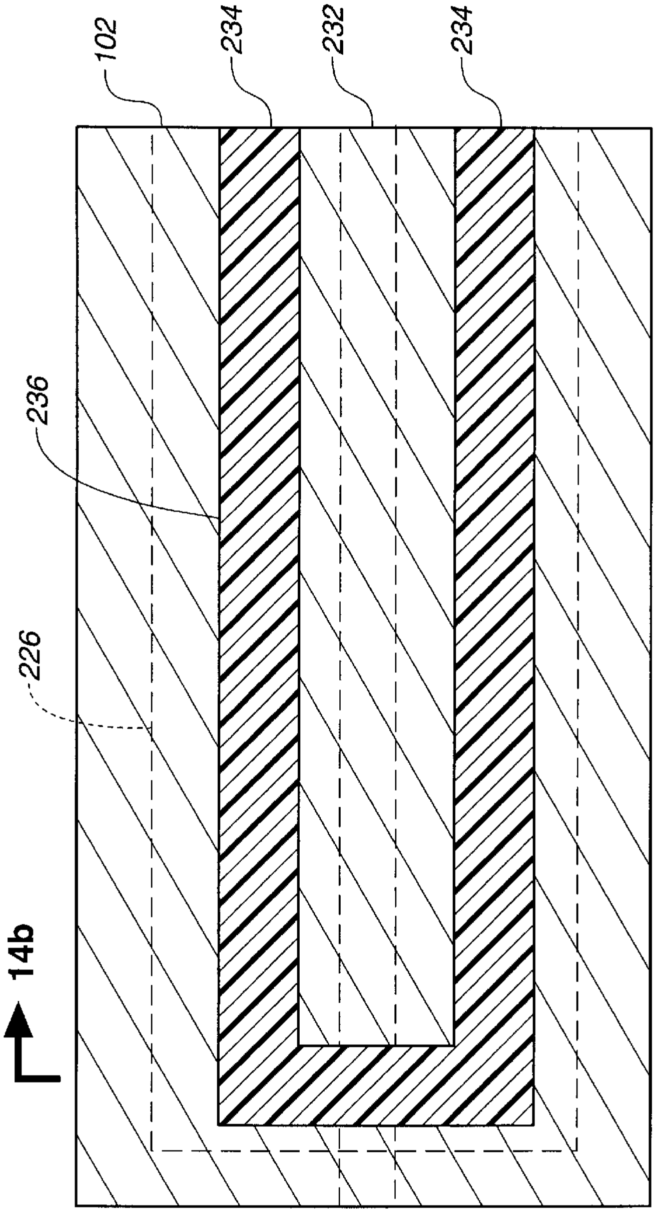
Figure 14B:
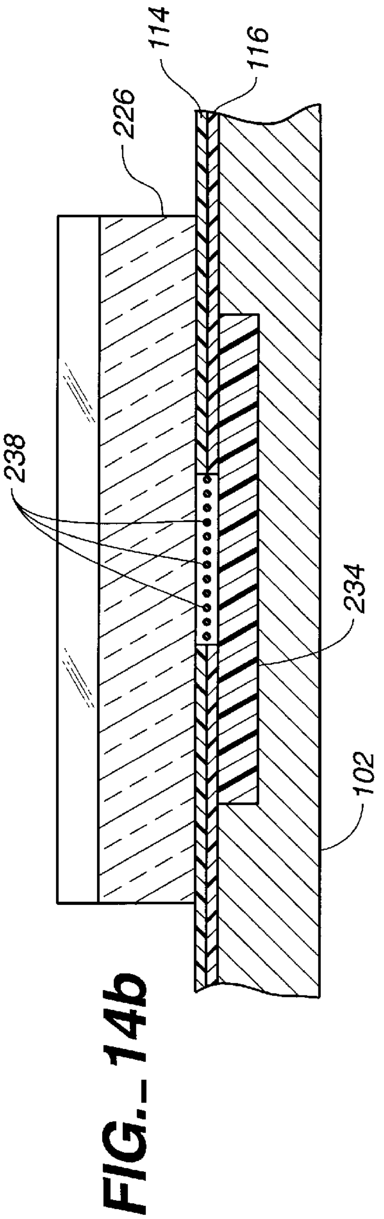

FIG. **7*a* is a plan view of the valve included in the microfluidic system taken along the line 7*a*—7*a* in FIG. 7** illustrating the relationship between the blade and the capillary;

FIG. **7*b* is a cross-sectional view of the valve included in the microfluidic system taken along the line 7*b*—7*b* in FIG. 7** illustrating the relationship between the blade and the capillary;

FIG. 8 is a cross-sectional view of an alternative embodiment, low dead volume implementation of the microfluidic valve depicted in FIG. 7;

FIG. 9 is a plan view depicting a portion of a microfluidic system implemented using the load dead volume microfluidic valve depicted in FIG. 8;

FIG. 10 is a plan view depicting a microfluidic system in which all of the valves are integrated into a single plate;

FIG. 10*a* is a cross-sectional view depicting the microfluidic system taken along the line 10*a*—10*a* in FIG. 10;

FIG. 11 is a plan view depicting a microfluidic system for shuttling liquid back and forth between two reaction chambers;

FIG. 11*a* is a cross-sectional view depicting the microfluidic system taken along the line 11*a*—11*a* in FIG. 11;

FIG. 12 is a cross-sectional view illustrating attachment of an ultraviolet transmissive Teflon windows over a segment of a capillary on both sides of a pouch;

FIG. 13 is a cross-sectional view illustrating attachment of an ultraviolet transmissive Teflon windows over a segment of a capillary on only one side of a pouch;

FIG. 14 is a cross-sectional view illustrating attachment of a Total Internal Reflection ("TIR") detector that contacts liquid within a capillary;

FIG. 14*a* is a cross-sectional view depicting the TIR detector taken along the line 14*a*—14*a* in FIG. 14;

FIG. 14*b* is a cross-sectional view depicting the TIR detector taken along the line 14*a*—14*a* in FIGS. 14 and 14*a;*

Figure 15:
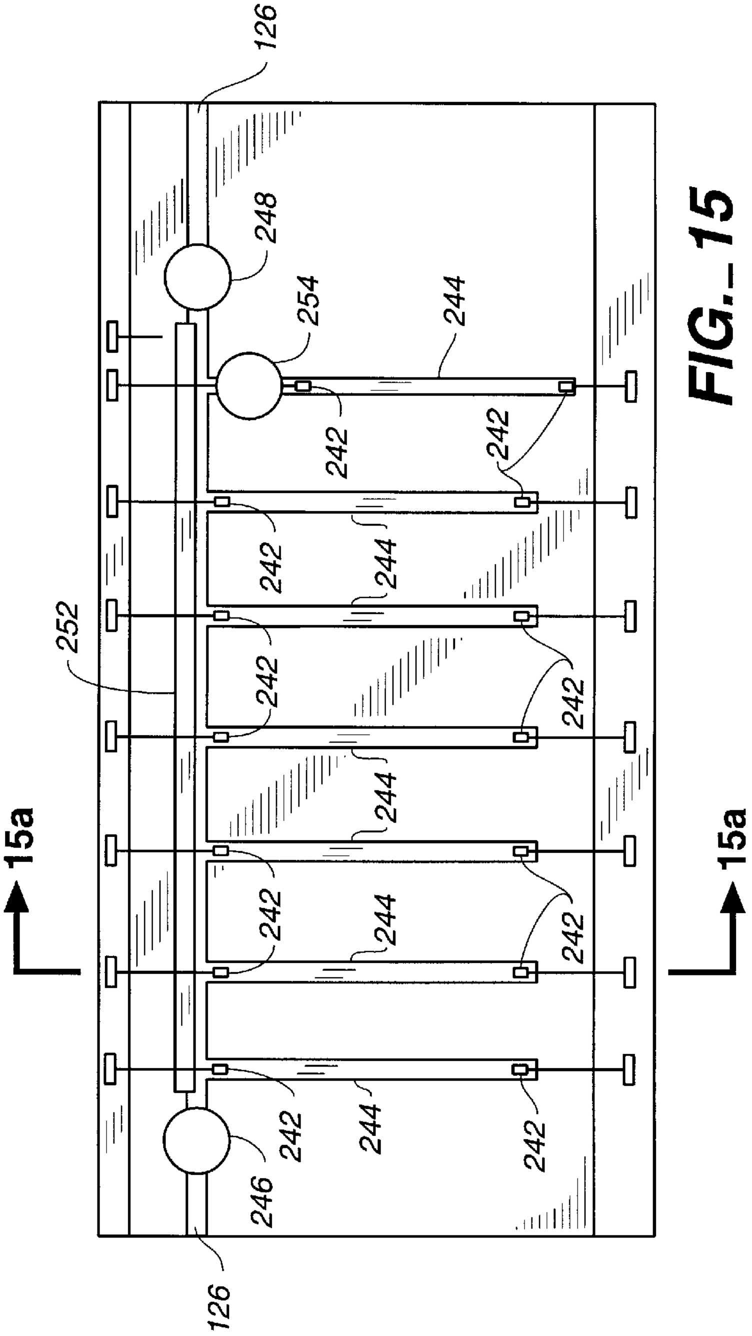
Figure 15A:
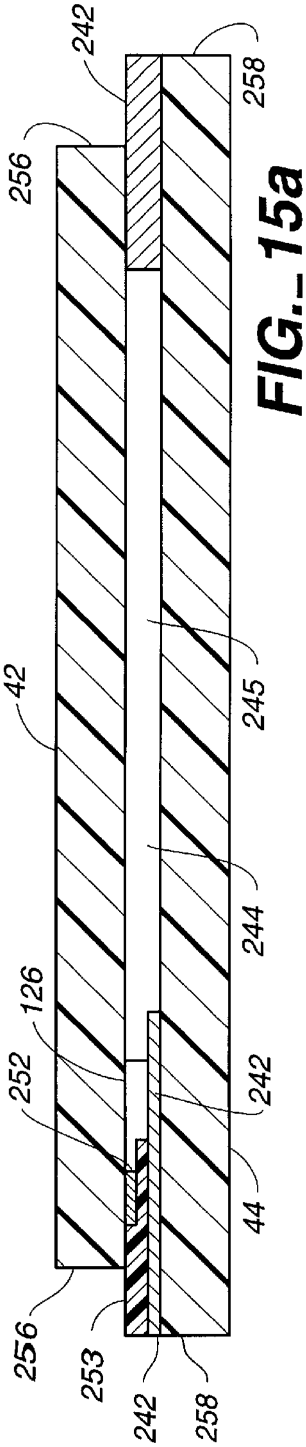
Figure 16:
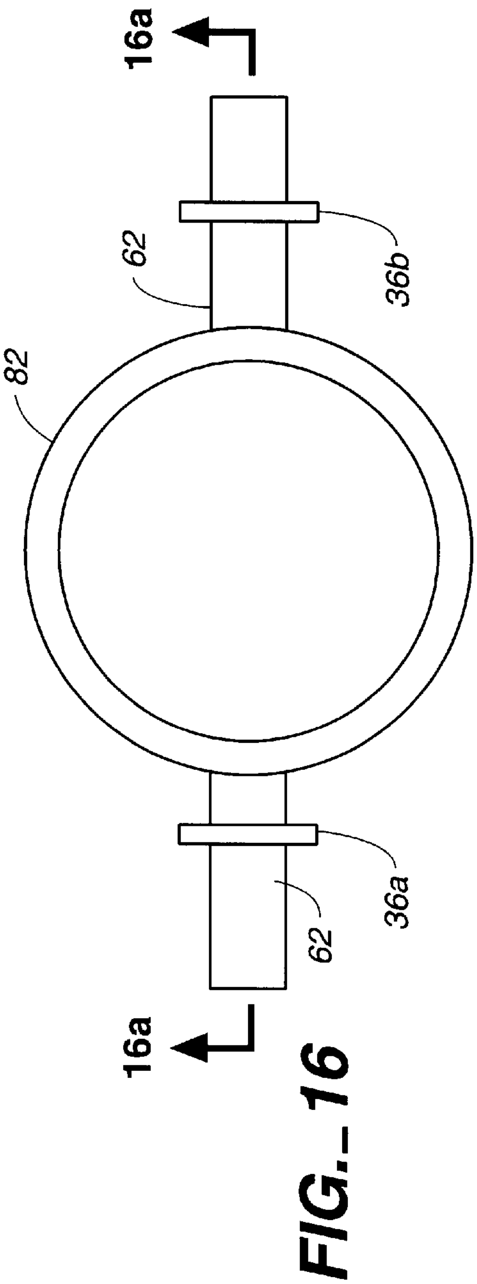
Figure 16A:
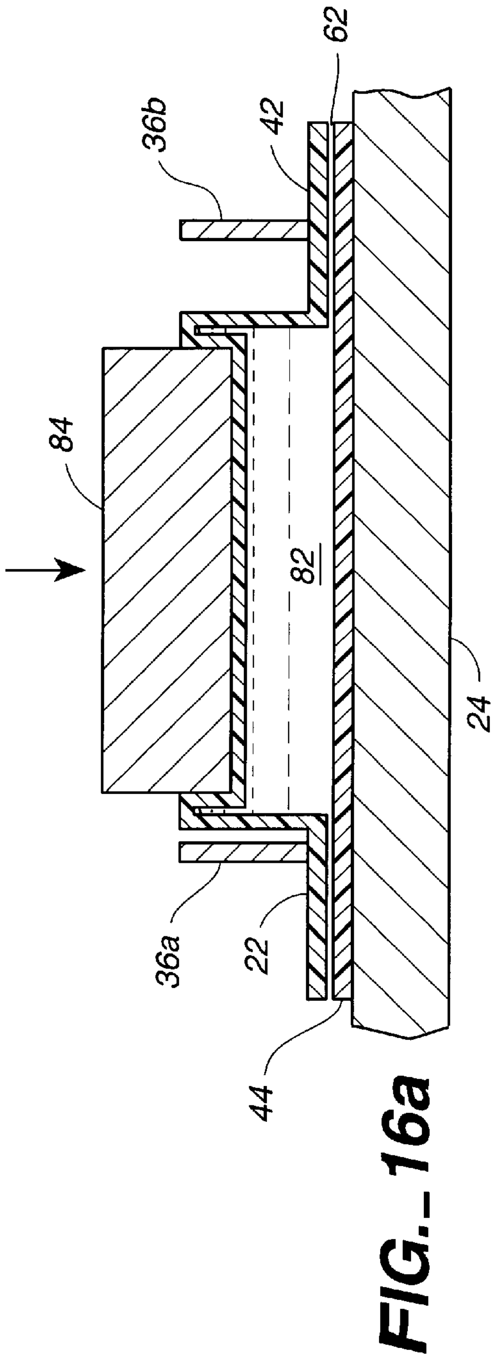

FIG. 15, is a plan view depicting a microfluidic electrophoresis detector;

FIG. 15*a* is a cross-sectional view depicting the microfluidic electrophoresis detector taken along the line 15*a*—15*a* in FIG. 15;

FIG. 16 is a plan view of a pair of microfluidic valves on either side of a reservoir that is adapted to dispense a precise quantity of liquid; and FIG. 16*a* is a cross-sectional view depicting microfluidic valves and reservoir taken along the line 15*a*—15*a* in FIG. 15.

DETAILED DESCRIPTION OF THE PREFERRED EMBODIMENT

Microfluidic Valve

Figure 1:
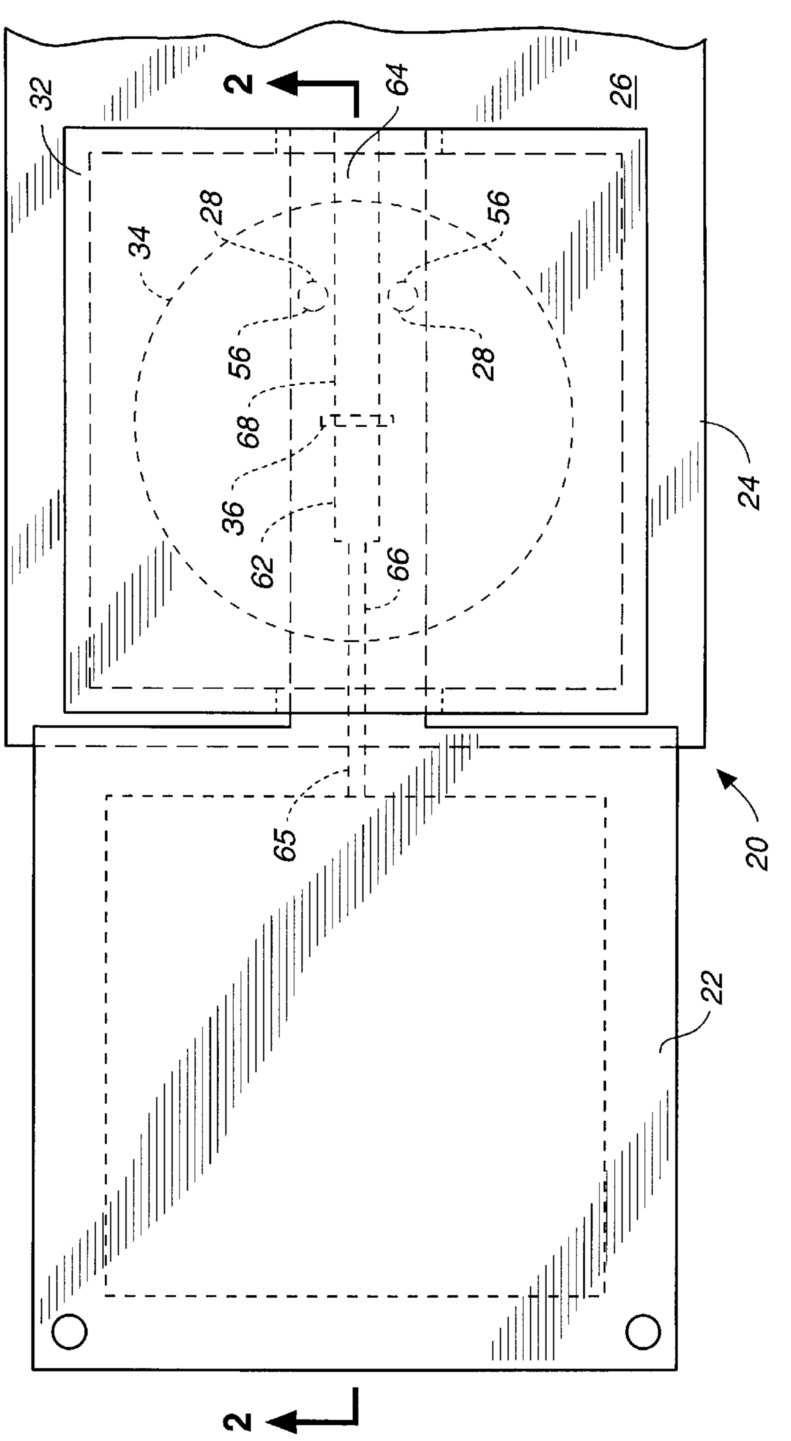
FIG. 1 is a plan view of a delivery system for controllably releasing a flow of a liquid from a pouch.
Figure 2:
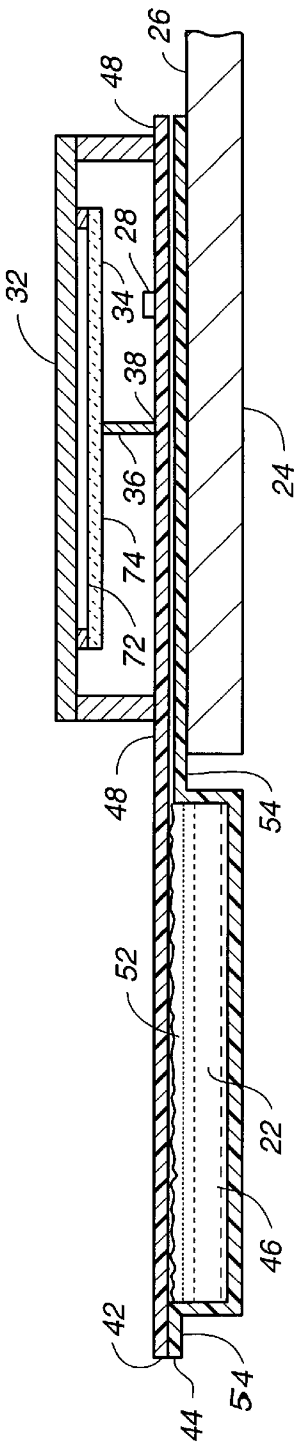
FIG. 2 is a cross-sectional view of the liquid delivery system taken along a line 2—2 in FIG. 1.

FIGS. 1 and 2 illustrate a microfluidic delivery system that is referred to by the general reference character 20. The microfluidic delivery system 20, which controllably releases a flow of a liquid from a planar pouch 22, includes a base plate 24. The base plate 24 has a planar anvil surface 26 from which projects a pair of registration pins 28.

Disposed above the anvil surface 26 of the base plate 24 is a hollow, pan-shaped valve housing 32 that is adapted to clamp the pouch 22 against the anvil surface 26. The valve housing 32 includes a disk-shaped piezo-electric actuator 34 that is secured within the valve housing 32 in an orientation in which increasing or decreasing an electric potential applied across the piezo-electric actuator 34 causes at least a portion of the piezo-electric actuator to extend toward or retract from the anvil surface 26. The piezo-electric actuator 34 may be a stress-biased lead lanthanum zirconia titanate ("PLZT") material. This material is manufactured by Aura Ceramics and sold under the "Rainbow" product designation. This PLZT unimorph provides a monolithic structure one side of which is a layer of conventional PLZT material. The other side of the PLZT unimorph is a compositionally reduced layer formed by chemically reducing the oxides in the native PLZT material to produce a conductive cermet layer. The conductive cermet layer typically comprises about 30% of the total disk thickness. Removing of the oxide from one side of the unimorph shrinks the conductive cermet layer which bends the whole disk and puts the PLZT layer under compression. The PLZT layer is therefore convex while the conductive cermet layer is concave. Alternatively, the piezo-electric actuator 34 may be made from other PZT materials either as a unimorph or as a bimorph.

The valve housing 32 also includes a blade 36 coupled to the piezo-electric actuator 34. The blade 36 is shaped so that extension of the piezo-electric actuator 34 toward the anvil surface 26, best illustrated in FIG. 2, urges an edge 38 of the blade 36 toward the anvil surface 26. Applying a prespecified voltage to the piezo-electric actuator 34 urges the blade 36 toward or away from the anvil surface 26. The blade 36 is typically a thin metal sheet, e.g. stainless steel, 1.0 mil to several mils thick, and short enough that it will not buckle when pressing against the anvil surface 26 by the piezo-electric actuator 34.

The pouch 22 is preferably made from upper and lower flexible, malleable polymeric sheets 42 and 44 that are one-half to a few mils thick. The sheets 42 and 44 are selectively laminated to form both a reservoir 46 and a substantially planar, elongated, paddle-shaped nozzle 48 that projects outward from the reservoir 46. During fabrication of the pouch 22, and typically before laminating the sheets 42 and 44 together, the lower sheet 44 is formed into a dish-shaped cavity 52 that is surrounded by a flat rim 54. Upon completion fabrication of the pouch 22, the cavity 52 becomes the liquid filled reservoir 46.

The nozzle 48 includes a pair of registration apertures 56 that mate with and engage the registration pins 28 of the base plate 24. The nozzle 48 is juxtaposed with the anvil surface 26 of the base plate 24, and interposed between the blade 36 of the valve housing 32 and the anvil surface 26. The nozzle 48 also includes an elongated capillary 62 formed between the sheets 42 and 44 that has an outlet port 64 opening distal from the reservoir 46 and an inlet port 65 at the reservoir 46. The capillary 62 may include a optional first segment 66 that extends outward from and communicates directly with the reservoir 46, and that has a comparatively small cross-sectional area. The first segment 66 of the capillary 62 may be formed by grooves litographically etched into the sheets 42 and 44 with either dry or wet etching. The optional first segment 66, which does not extend between the blade 36 and the anvil surface 26, acts as a flow restriction during operation of the microfluidic delivery system 20. A second segment 68 of the capillary 62 extends outward from and communicates directly with the first segment 66, and has a cross-sectional area that is larger than the cross-sectional area of the optional first segment 66. The capillary 62 is disposed between the blade 36 and the anvil surface 26 when the registration apertures 56 of the nozzle 48 mate with and engage the registration pins 28 of the base plate 24. Furthermore, the valve housing 32 may be keyed to the anvil surface 26 to correctly register the blade 36 with respect to the capillary 62. The surface of the valve housing 32 that overlays the capillary 62 within the nozzle 48 must be relieved so pressure of the valve housing 32 against the sheet 42 does not occlude the capillary 62. Prior to inserting the nozzle 48 between the blade 36 and the anvil surface 26, the pouch 22 may include a "filling nozzle," such as those described in greater detail below, for filling the reservoir 46 with liquid.

Upon retracting the blade 36 of the valve housing 32 from the anvil surface 26 of the base plate 24, pressure applied to the reservoir 46 urges the liquid in the reservoir 46 to flow along the capillary 62 and through the outlet port 64. Conversely, extending the blade 36 toward the anvil surface 26 presses the malleable material of the nozzle 48 together thereby occluding the capillary 62 and barring the liquid from flowing from the reservoir 46 along the nozzle 48 with the sheets 42 and 44 where pressed together by the blade 36 forming a valve seat. To surely block the capillary 62 when the blade 36 extends toward the anvil surface 26, the blade 36 has a width perpendicular to the capillary 62 that exceeds the width of the capillary 62.

When the blade 36 occludes the capillary 62, preload in the piezo-electric actuator 34 for typical applications provides a force of one to several hundred grams urging the blade 36 toward the anvil surface 26. To open the capillary 62, the piezo-electric actuator 34 is electrically activated by applying a voltage across electrodes 72 and 74 covering opposite surfaces of the disk-shaped piezo-electric actuator 34. Application of a voltage across the electrodes 72 and 74 retracts the piezo-electric actuator 34 together with the blade 36 from the anvil surface 26. Because the preferred stress biased piezo-electric actuator 34 provides very large deflections, on the order of hundreds of microns responsive to application of a few hundred volts, fabrication of the microfluidic delivery system 20 involves feasible mechanical tolerances. Furthermore, such a displacement of the piezo-electric actuator 34 and the blade 36 is sufficient to overcome the preload imposed by the valve housing 32, and to thereby open the capillary 62. Since liquid flow from the microfluidic delivery system 20 is electrically controllable, opening and closing of the valve may be effected by signals from a microprocessor, not illustrated in any of the FIGs.

In fabricating the pouch 22, after forming the cavity 52, and, if desired, etching the optional first segment 66 into the sheets 42 and 44, the sheets 42 and 44 are selectively laminated along their perimeter encircling the reservoir 46 and along the elongated edges of the capillary 62 within the nozzle 48. The sheets 42 and 44 may consist of just about any polymer, preferably one that can be heat sealed. Even polyethylene pouches 22 have been successfully used. Preferred materials for the sheets 42 and 44 are polyimide or Teflon® coated polyimide due to such materials' inertness and mechanical properties. The sheets 42 and 44 are preferably laminated together using thermocompression bonding, thereby producing a bond which does not increase the thickness of the juxtaposed sheets 42 and 44, and provides a "zero thickness" and hence leak-free bond at the edge of the capillary 62.

Ultrasonic bonding may also be used to laminate the sheets 42 and 44 together. Alternatively, a bonding agent may be silk screened onto one of the sheets 42 or 44 to selectively bond them together only in pre-established areas upon juxtaposing the two sheets 42 and 44. However, such a bonding agent must be as thin as possible since operation of the valve relies on pinching two sheets 42 and 44 together. However, methods for dispensing bonding agents, as thin as a few thousand angstroms, with very good uniformity over large areas are commercially available.

Coupling two of the valves described above in series with a small reservoir located in the capillary 62 between them permits producing a flow rate that is independent of the liquid's viscosity. In such a two stage valve, the second valve closes and then the first valve opens long enough to completely fill and pressurize the intermediate capillary 62. After the intermediate capillary 62 is full and pressurized, the first valve closes and the second valve opens long enough to completely discharge the liquid in the intermediate capillary 62.

FIG. 16 depicts two valves, indicated by the blades **36*a* and 36*b*, located along capillary 62 on opposite sides of a processing chamber 82 that may be used to dispense a precise quantity of liquid, similar to a conventional pipette. The capillary 62 may be understood as being simply an enlarged region extending out on either side of the capillary 62 that crosses FIGS. 16 and 16*a* from left to right. The processing chamber 82 may be formed in the sheet 42 in the same way as the cavity 52, depicted in FIGS. 1 and 2, is formed in the sheet 44. To dispense a precise quantity of liquid, the blade 36*b* pinches off the capillary 62 while the blade 36*a* opens to admit liquid into the processing chamber 82 from a reservoir such as the reservoir 46 illustrated in FIGS. 1 and 2. After the processing chamber 82 fills with liquid, the blade 36*a* pinches off the capillary 62 and the blade 36*b* opens. Then a piston 84, illustrated in FIG. 16*a*, descends a pre-established distance pressing on the sheet 42 overlying the processing chamber 82. The piston 84 may be urged downward by a piezo-electric actuator, not separately illustrated in FIGS. 16 and 16*a*, that is similar to the piezo-electric actuator 34 depicted in FIGS. 1 and 2. The controlled downward displacement of the piston 84 discharges a precisely controlled amount of liquid from the processing chamber 82 into the capillary 62 past the blade 36*b*. Downward movement of the piston 84 may discharge only a portion of the liquid within the processing chamber 82, or may drive all of the liquid from the processing chamber 82**.

While the valve of the microfluidic delivery system 20 is actuated by the piezo-electric actuator 34 as described thus far, if electrical power consumption and heat are not considerations, a spring-loaded magnetic actuator may be used instead of the piezo-electric actuator 34. In such a magnetic actuator, a suitable spring provides a preload urging the blade 36 toward the anvil surface 26, and a force generated electromagnetically overcomes the preload and retracts the blade 36 from the anvil surface 26.

Microfluidic System

Figure 3:
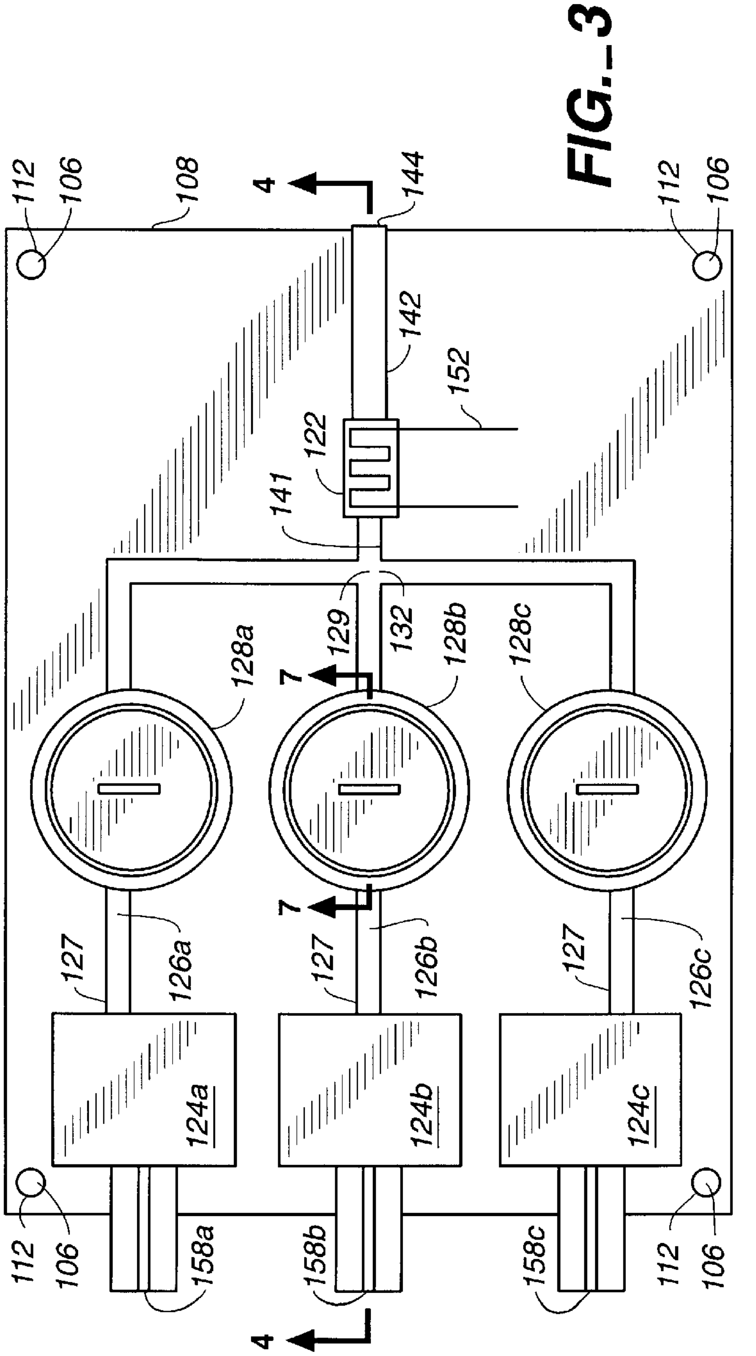
FIG. 3 is a plan view of a microfluidic system in accordance with the present invention that uses pouches for holding liquids and for performing chemical reactions.
Figure 4:
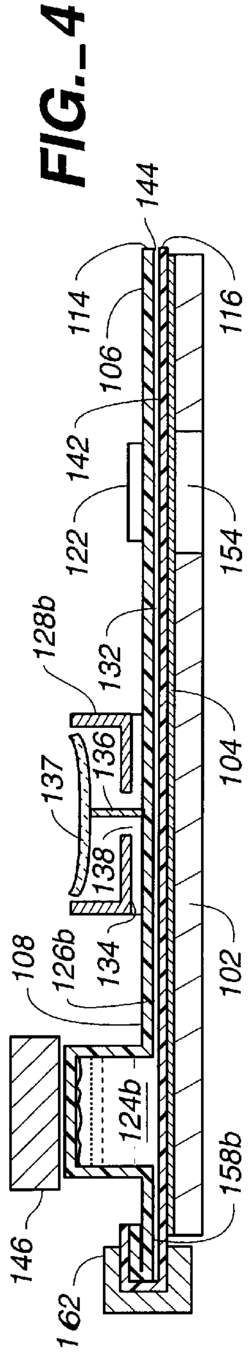
FIG. 4 is a cross-sectional view of the liquid delivery system taken along a line 4—4 in FIG. 3.

FIGS. 3 and 4 illustrate a microfluidic system in accordance with the present invention referred to by the general reference character 100. Similar to the microfluidic delivery system 20, the microfluidic system 100 includes a base plate 102. The base plate 102 has a planar anvil surface 104 from which project four registration pins 106. A substantially planar pouch 108 rests on the anvil surface 104, and four registration apertures 112 formed through the pouch 108 mate with and engage the registration pins 106 of the base plate 102. Similar to the pouch 22 depicted in FIGS. 1 and 2, the pouch 108 is preferably made from upper and lower flexible, malleable polymeric sheets 114 and 116 that are one-half to a few mils thick. Differing from the pouch 22, the pouch 108 includes at least one reaction chamber 122, and in the illustration of FIGS. 3 and 4, three liquid filled reservoirs **124*a*, 124*b*, and 124*c*. Three planar capillaries 126*a*, 126*b* and 126*c* respectively communicate directly with and extend outward from the reservoirs 124*a*, 124*b*, and 124*c*. Similar to the first segment 66 of the capillary 62 depicted in FIGS. 1 and 2, any of the capillaries 126*a*, 126*b* and 126*c* may be narrowed between the reservoirs 124*a*, 124*b*, and 124*c* and the to provide restrictors for such capillaries 126*a*, 126*b* and 126*c***.

The three elongated capillaries **126*a*, 126*b* and 126*c*, extending away from their respective inlet ports 127 at the reservoirs 124*a*, 124*b*, and 124*c*, respectively pass beneath one of three valve assemblies 128*a*, 128*b*, or 128*c* before reaching their outlet ports 129 at a common juncture 132. The valve assemblies 128*a*, 128*b*, and 128*c*, which are similar to the valve depicted in FIGS. 1 and 2, are pressed against the planar pouch 108 with clamps or springs, that are not illustrated in any of the FIGs. As indicated in FIG. 4, a lower surface 134 of each valve assemblies 128***a*, 128*b*, and 128*c* contacts the sheet 114 of the pouch 108. However, to avoid occluding the capillaries 126*a*, 126*b* and 126*c* the lower surface 134 is relieved along the length of the capillaries 126*a*, 126*b* and 126*c* that passes between the valve assemblies 128*a*, 128*b*, or 128*c* and the anvil surface 104. Similar to the microfluidic delivery system 20 depicted in FIGS. 1 and 2, a blade 136 included in each of the valve assemblies 128*a*, 128*b*, and 128*c* extends downward from a piezo-electric actuator 137 through an aperture 138 formed through the lower surface 134 of each of the valve assemblies 128*a*, 128*b*, and 128*c*. If the piezo-electric actuator 137 is not energized, the blade 136 presses against the sheet 114 thereby respectively occluding the capillaries 126*a*, 126*b* and 126*c*. If the piezo-electric actuator 137 is electrically energized, then the blade 136 retracts from the anvil surface 104 thereby opening the capillaries 126*a*, 126*b* or 126*c*.

An inlet port 141 of a common capillary 142, which passes through the reaction chamber 122, couples the juncture 132 of the capillaries 126*a*, 126*b* and 126*c* to an outlet port 144 of the common capillary 142. The microfluidic system 100 includes a plunger 146 disposed above each of the reservoirs 124*a*, 124*b*, and 124*c*, only one of which is illustrated in FIG. 4. The plungers 146 respectively apply pressure to the reservoirs 124*a*, 124*b*, and 124*c* for forcing liquid from the reservoirs 124*a*, 124*b*, and 124*c* through the capillaries 126*a*, 126*b* and 126*c* to the reaction chamber 122. If the pouch 108 is fabricated from layers of a suitable polymeric material such as polyimide, the reaction chamber 122 may be heated either by a resistive electric heater 152 integrated into the pouch 108 as is commonly done, or the base plate 102 may include a block heater and/or thermoelectric cooler 154 located in the base plate 102 that is juxtaposed with the reaction chamber 122. The pouch 108 may include additional mixing and reaction chambers as required for a chemical process to be performed by the microfluidic system 100.

Similar to the pouch 22 depicted in FIGS. 1 and 2, the pouch 108 is preferably fabricated by laminating the sheets 114 and 116 to outline the reservoirs 124*a*, 124*b*, and 124*c*, capillaries 126*a*, 126*b* and 126*c*, reaction chamber 122, and common capillary 142. Entire areas of the sheets 114 and 116 may be laminated, or laminations may be formed only partially to outline the patterns. All the reservoirs 124*a*, 124*b*, and 124*c* are made in the same way as that described above for the reservoir 46 depicted in FIGS. 1 and 2 (typically through hot deformation and selective hot bonding or selective attachment). Similarly, the capillaries 126*a*, 126*b* and 126*c* and the common capillary 142 are again defined by the laminating the sheets 114 and 116. As described above in connection with FIGS. 1 and 2, flow restrictors that restrict the liquid flow can be formed by dry or wet etching the sheets 114 and 116.

As also described above in connection with FIGS. 1 and 2, after the pouch 108 has been laminated the reservoirs 124*a*, 124*b*, and 124*c* may be respectively filled through filling nozzles 158*a*, 158*b* and 158*c*. After the reservoirs 124*a*, 124*b*, and 124*c* have been filled, the filling nozzles 158*a*, 158*b* and 158*c* may be sealed to retain the liquid. Sealing may be effected either with heat and pressure, or even with ultrasonic bonding which is a comparatively cool process. Alternatively, the filling nozzles 158*a*, 158*b* and 158*c* can be left open allowing samples to be infused into the reservoirs 124*a*, 124*b*, and 124*c* (e.g. with a syringe) as required. Yet another alternative, depicted in FIG. 4, is folding a crease into the laminated sheets 114 and 116 after filling the reservoirs 124*a*, 124*b*, and 124*c* to seal off the filling nozzles 158*a*, 158*b* and 158*c*, and then holding the filling nozzles 158*a*, 158*b* and 158*c* in the folded configuration with a pinch clamp 162. Alternatively, to avoid using a syringe, elongated, flat filling nozzles 158*a*, 158*b* and 158*c* may be fabricated and incorporated into a peristaltic pump, not illustrated in any of the FIGs., that pumps liquid into the reservoirs 124*a*, 124*b*, and 124*c*. In such a microfluidic system 100, rather than the reservoirs 124*a*, 124*b*, and 124*c*, containers external to the pouch 108 may be used and connected directly to capillaries 126*a*, 126*b* and 126*c* if so desired.

To permit introducing a sample for analysis into a previously prepared and sealed pouch 108, analogous arrangements may be used. For example. the pinch clamp 162 may be removed and the sample introduce through one of the filling nozzles 158*a*, 158*b* and 153*c*. Alternatively, if for example pouch 108 is already clamped within the microfluidic system 100, the sample may be introduced by perforating sealed filling nozzles 158*a*, 158*b* or 158*c* with a syringe, and then manually pushing or squeezing the syringe further along the filling nozzles 158*a*, 158*b* and 158*c* until it reaches the corresponding reservoirs 124*a*, 124*b*, or 124*c*. Alternatively, a self-sealing porous plug, such as those used in gas chromatography, that can be perforated with a syringe may be sealed between the sheets 114 and 116 within the filling nozzles 158*a*, 158*b* or 158*c*.

The microfluidic system 100 permits dispensing at will, under microprocessor control at predetermined flow rates, liquids, samples, chemicals, reagents and body fluids, and mixing them together for diagnostic medical or analytical tests, DNA sequencing etc. After the process has been completed, the valve assemblies 128*a*, 128*b*, and 128*c* can be simply popped off, and a new pouch 108 installed. Should any valve malfunction, it can also be readily replaced. There is never any direct contact between the blades 136 and the liquids flowing through the capillaries 126*a*, 126*b* and 126*c*. Even in a system that employs external containers rather than the reservoirs 124*a*, 124*b*, and 124*c*, removal of the pouch 108 still allows easy disposal of the reaction chamber 122 and remnants of materials remaining in the capillaries 126*a*, 126*b* and 126*c* and common capillary 142. Because a chemically inert polymer may be chosen for the sheets 114 and 116, the reaction chamber 122 may be heated or cooled etc. to promote or control a chemical reaction.

The microfluidic system 100 concept is well adapted for performing diagnostic tests. For diagnostic use, the whole pouch 108, including all the desired reagents, can be prepared beforehand and then stored or frozen if needed, to be installed on the anvil surface 104 when ready for use. Then, when the pouch 108 is at the proper temperature, a specimen to be analyzed is introduced and the reactions performed. Pressure may be applied to the reservoirs 124*a*, 124*b*, and 124*c* by mechanical springs, or by external pneumatic means. A microprocessor, not illustrated in any of the FIGS., may control opening and closing of the valve assemblies 128*a*, 128*b*, and 128*c*. The high voltages but very low power that must be applied to the piezo-electric actuators 137 to operate the valve assemblies 128*a*, 128*b*, and 128*c* can be readily generated by fly-back circuits well known to those familiar with electronic circuits. Consequently, operation of the microfluidic system 100 may be energized by a single 3 Volt ("V") battery.

Figure 5:
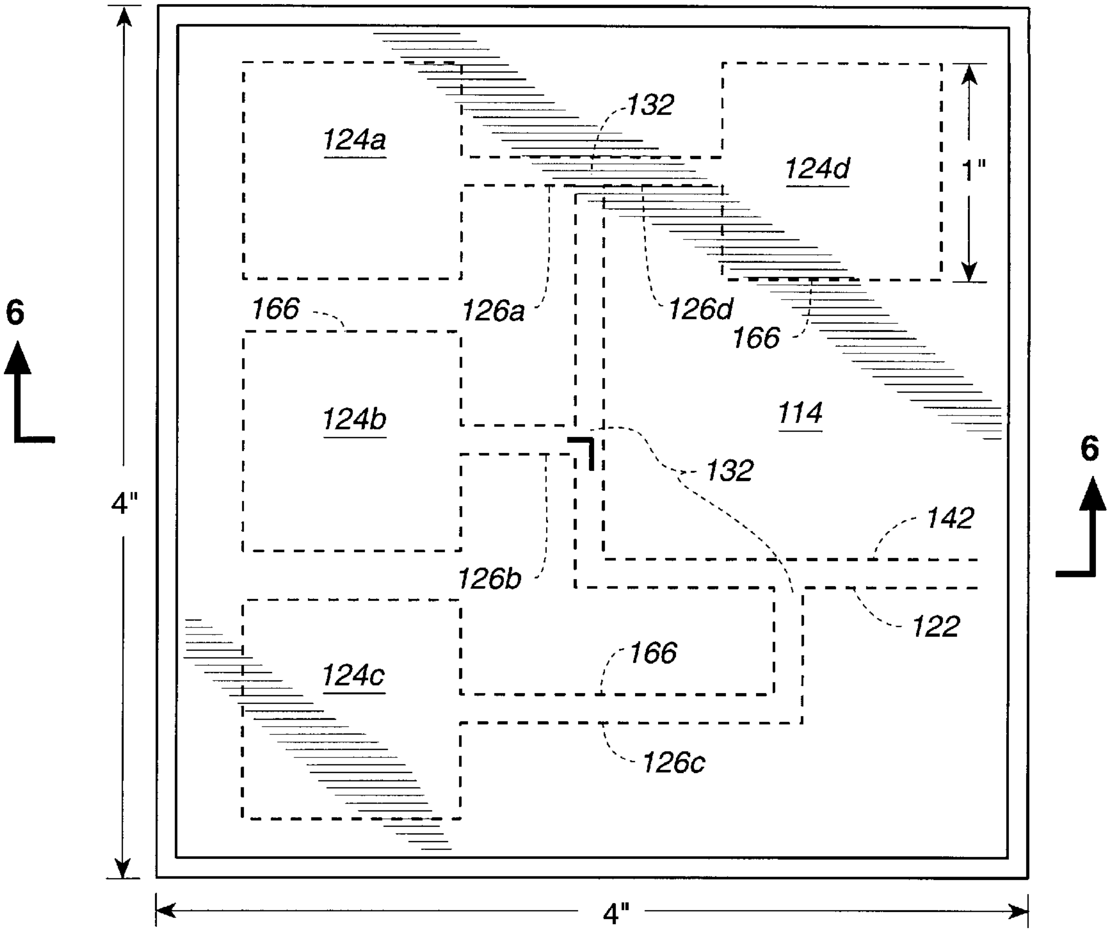
FIG. 5 is a plan schematic view illustrating dimensions for a pouch that may be used in microfluidic systems of the type depicted in FIG. 3.
Figure 6:
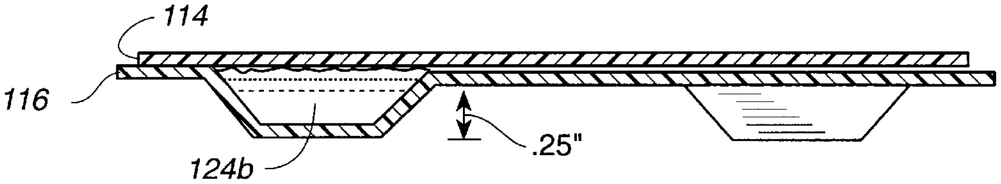
FIG. 6 is a cross-sectional view of the pouch taken along the line 6—6 in FIG. 5.

FIG. 5 illustrates dimensions of a typical pouch 108 which may be used in the microfluidic system 100 although the dimensions are in no way intended to limit the scope of the invention. In FIG. 5, laminations 166, indicated by broad black lines, are areas of the sheets 114 and 116 which have been laminated together to establish reservoirs 124*a*, 124*b*, 124*c* and 124*d*, capillaries 126*a*, 126*b*, 126*c* and 126*d*, junctures 132, the reaction chamber 122 and the common capillary 142. It is not necessary to laminate together the entire areas outside of the reservoirs 124*a*, 124*b*, 124*c* and 124*d*, capillaries 126*a*, 126*b*, 126*c* and 126*d*, junctures 132, reaction chamber 122 and common capillary 142. Laminating the peripheries of these areas is sufficient. Laminations as narrow as 0.008 in.–0.010 in. along the laminations 166 are possible. The laminations 166 may establish capillaries 126*a*, 126*b*, 126*c* and 126*d* and common capillary 142 that are as narrow as 0.010 inch. The vertical height of the capillaries 126*a*, 126*b*, 126*c* and 126*d* and common capillary 142, illustrated in FIG. 6, may be restricted to a few thousandths of an inch. Hence the effective cross-sectional area of the capillaries 126*a*, 126*b*, 126*c* and 126*d* and common capillary 142 may be made very small if desired.

Microfluidic Valves 128

Figure 7B:
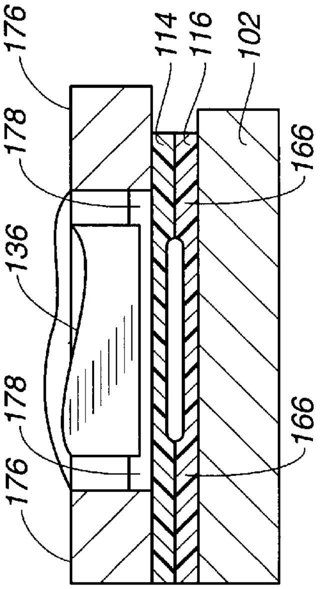
Figure 7A:
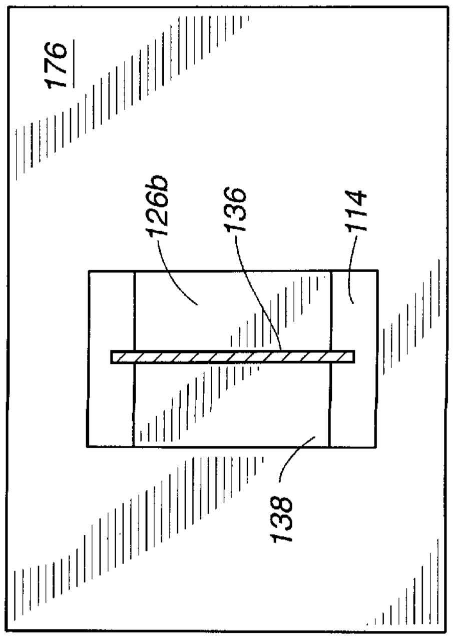

FIG. 7 depicts a cross-sectional view of a preferred embodiment of the valve assembly 128*b* taken along the line 7—7 in FIG. 3 with the valve assembly 128*b* pressing against the pouch 108. The blade 136, in the form of a leaf spring 172, contacts the piezo-electric actuator 137 with a dimple 174, thereby providing for self-adjusting leveling against the pouch 108 located beneath the valve assembly 128*b*. As depicted in FIGS. 7*a* and 7*b*, the piezo-electric actuator 137 and the blade 136 are mounted in a valve housing 176 such that blade 136 protrudes a pre-established distance, e.g. 0.001 inch to 0.005 inch, beyond the lower surface 134 of the valve assembly 128*b* when not contacting the sheet 114. Protrusion of the blade 136 beyond the lower surface 134 of the valve assembly 128*b* establishes a preload for the blade 136 pressing against the sheet 114. The valve assembly 128*b* presses against the sheet 114, and hence presses the pouch 108 against the base plate 102. To avoid inadvertently occluding the capillary 126*b*, a groove 178 in the valve housing 176, that is oriented parallel to but is wider than the capillary 126*b*, avoids contact between the valve assembly 128*b* and the sheet 114 along the length of the capillary 126*b* extending beneath the valve assembly 128*b*. Consequently, the only pressure contact on the sheet 114 along the capillary 126*b* comes from blade 136, which can be electrically retracted to open the capillary 126*b*.

For certain applications involving chemical analysis, it is desirable to have a valve 128 which has a very low dead volume, i.e. a valve 128 which holds only a small amount of material past the point where the flow is turned on and off. As illustrated in FIG. 8, a valve 128 can be constructed in accordance with the present invention that almost eliminates dead volume. In such a low dead volume valve 128, the blade 136 extends beyond the envelope of the valve housing 176. As illustrated in FIG. 9, since there is no longer any interference from the valve housing 176 of the valve 128 depicted in FIG. 8, such valves 128 may be located immediately adjacent to the juncture 132 of two capillaries 126. Flow from one of the capillaries 126 is immediately picked up in the common capillary 142 without tailing and vice versa, since the entire common capillary 142 is flushed right up to the blades 136 that occlude the capillaries 126.

Microfluidic Systems 100

If several valves 128 are required to assemble the microfluidic system 100, in principle, the valves 128 could all be separately urged toward the base plate 102 to press against the pouch 108. However, for such a microfluidic system 100 it is highly desirable to integrate all of the valves 128 onto a valve plate 182 as illustrated in FIGS. 10 and 10*a*. Similar to the pouch 108, the valve plate 182 includes valve-plate registration-apertures 184 piercing the valve plate 182 that mate with and engage the registration pins 106 of the base plate 102. Thus, the pouch 108 is clamped between the base plate 102 and the valve plate 182. In this way, all valves 128 mounted on the valve plate 182 are thus concurrently positioned with respect to the capillaries 126 and their blades 136 preloaded. Not all valves 128 need be at the same horizontal level. The base plate 102 and the valve plate 182 may have several different, but matching horizontal sections. The valve plate 182 must be sufficiently stiff that it does not bend so the valves 128 attain their pre-specified preload values. In principle, all piezo-electric actuators 137 may be directly attached to the valve plate 182, and the blades 136 all adjusted at the same time. However, each of the valves 128 is preferably mounted on the valve plate 182 as a free-floating, separate assembly that is spring-loaded with respect to the valve plate 182 to be urged toward the base plate 102 with a force that is much greater than the preload of the blade 136. Such a method for mounting the valves 128 in the valve plate 182 accommodates any irregularities in spacing between the base plate 102 and the valve plate 182. Preloads for the valves 128 may differ depending upon the design and characteristics of the pouch 108. A spring or pneumatic system 182 applies pressure against the reservoirs 124*a*, 124*b*, and 124*c*, if necessary.

In areas of contact between a lower surface 192 of the valve plate 182 and the pouch 108, it is desirable to provide short ridges 188 preferably protruding from the anvil surface 104 of the base plate 102, or from the lower surface 134 of the valves 128. The ridges 188 limit contact between the valves 128 and the pouch 108 to small areas in the immediate vicinity of the valves 128. Thus, the ridges 188 establish well controlled forces in pre-established areas surrounding the blades 136. The ridges 188 run lengthwise parallel to the capillaries 126, and provide for intimate local contact between the valves 128 and the pouch 108. Protrusion of each blade 136 out of each valve 128 is referenced to the immediately adjacent ridges 188, and, therefore, the preload for each of the valves 128 can be accurately set over the whole area of the pouch 108. The block heater and/or thermoelectric cooler 154 and reaction chamber 122 are similar to those depicted in FIGS. 3 and 4, and may be located anywhere on the base plate 102 as desired. For example, the valves 128 can be located at intersections of a grid system if so desired to facilitate designing the microfluidic system 100. A valve plate 182 may be fabricated that is adapted to receive modular valves 128 at vertices of a two dimensional grid. Then, depending upon a particular process to be performed with the microfluidic system 100 and the configuration of the pouch 108, individual valves 128 can be mounted in the valve plate 182 at appropriate vertices of the two dimensional grid for performing the process. Subsequently, the microfluidic system 100 could be adapted for performing an entirely different process using a pouch 108 having a totally different configuration merely by rearranging the valves 128 on the valve plate 182.

The microfluidic system 100 can be effectively applied to integrate the PCR technique that is used in amplifying a minute amount of a nucleotide material. FIGS. 11 and 11*a* illustrate a portion of the microfluidic system 100 that has been especially adapted for performing PCR. If the pouch 108 used for PCR is made from polyimide, it can be readily heated and cooled sufficiently to perform PCR without damage. As stated previously, with a polyimide pouch 108 heaters may be applied to the pouch 108 itself. Alternatively, since temperatures for performing PCR are typically below 100° C., many other polymeric materials may be used instead of polyimide. As illustrated in FIG. 11*a,* heaters and/or coolers 196 can be located in the base plate 102 immediately beneath the pouch 108, or above the pouch 108 in the valve plate 182 (not illustrated in FIG. 11 or 11*a*), or in both. The planar geometry of the microfluidic system 100 has excellent thermal properties conducive to processing small samples such as those required for PCR.

To adapt the microfluidic system 100 for performing PCR, the pouch 108 includes two thin, flat processing chambers 198 established between the selectively laminated sheets 114 and 116. The processing chambers 198 may be understood as being simply enlarged regions extending out on either side of the capillary 126 that crosses FIGS. 11 and 11*a* from left to right. If necessary, the two processing chambers 198 may be isolated from each other by a central valve which is illustrated in FIGS. 11 and 11*a* by only the blade 136. The capillary 126 extending outward on either side of the processing chambers 198 together with valves located on either side thereof, that are also indicated by only the blades 136 in FIGS. 11 and 11*a*, provide alternative paths for controllably introducing liquid into the processing chambers 198.

To initiate PCR, the sample is introduced into either of the processing chambers 198 with TAQ primers added. Subsequently, the liquid in the processing chambers 198 is periodically temperature cycled between the appropriate PCR temperatures T1 and T2. Temperature cycling can be accomplished by heating or cooling the processing chambers 198, or, preferably, by periodically shuttling the liquid back and forth between the processing chambers 198 while maintaining the processing chambers 198 respectively at the two PCR temperatures. One way to shuttle the liquid back and forth between the two processing chambers 198 is by opening all the valves and admitting a liquid into either one or the other processing chamber 198. Alternatively, the liquid may be shuttled back and forth between the two processing chambers 198 by a pair of piezo-electric transducers, not illustrated in any of the FIGs. of the same type used in the valves 128 that are coupled to pistons 202 illustrated in FIG. 11*a*. If the microfluidic system 100 employs the pistons 202, the piezo-electric transducers alternatively press the pistons 202 down first onto one of the processing chambers 198 and then onto the other processing chamber 198. As is readily apparent, electromagnetic drivers could be used instead of piezo-electric transducers for energizing motion of the pistons 202. To enhance temperature uniformity while performing PCR, the pistons 202 may also be maintained at the temperatures T1 and T2 required for PCR. After performing the requisite number of cycles to complete PCR, the product thus obtained may be transferred through the capillary 126 to its ultimate destination.

Mixing of liquids is another operation that may also be performed using a pair of processing chambers 198 such as that depicted in FIGS. 11 and 11*a*. Such intimate mixing of liquids present in one processing chamber 198 may be achieved by periodically shuttling the liquid to an adjacent processing chamber 198 using the pistons 202 as described above. Intimate mixing of liquid in the initial processing chamber 198 occurs due to high turbulence which occurs during transfer through the capillary 126 to the second processing chamber 198. Alternatively, a lesser degree of mixing can be obtained by periodically tapping the processing chamber 198 with a piston 202 having a knurled face that contacts the upper sheet 114 that covers the processing chamber 198.

The planar form of the processing chambers 198 and capillaries 126 permits integrating a variety of simple detectors into the microfluidic system 100. For example, thin Teflon sheet is quite transparent to ultraviolet ("UV") radiation. If the pouch 108 is formed from sheets 114 and 116 of polyimide or Teflon coated polyimide, which is less transparent to UV radiation that Teflon, then a Teflon window may be attached over parts of the processing chambers 198 and/or capillaries 126 as illustrated in FIG. 12. To establish such windows, a Teflon coating 212 3 on the lower polyimide sheet 116 is bonded hermetically (e.g. thermally, chemically or ultrasonically) to a Teflon window 214 that provides UV transparency through the sheet 116. While even a 0.001 inch thick film of polyimide is transparent only to a wavelength of about 5000 Å, a 0.001 inch thick Teflon film has a transparency of 82% at 2540 Å. Thus, the Teflon window 214 permits efficient exposure of liquids within the processing chamber 198 or capillary 126 to excitation using various sources of deep UV light. A 0.001 inch thick Teflon window 214 also transmits 97% of all solar radiation impinging upon it at normal incidence, and shows virtually no absorption up to a 7 micron wavelength. Accordingly, the Teflon window 214 permits fluorescence analysis of chemical species present within the processing chamber 198 or capillary 126. Two overlapping Teflon windows 214, one on each side of the pouch 108 may be used to make transmission type measurements. Alternatively, a single Teflon window 214 may be positioned on top of the pouch 108 as illustrated in FIG. 13, by providing a Teflon coating 212 on the outside of the top sheet 114, or by bonding a layer of Teflon film to the sheet 114 using other means. This location for the Teflon window 214 impedes the fluid flow through the capillary 126 much less than locating the Teflon window 214 beneath the bottom sheet 116.

One detector which also ends itself very well to the planar geometry of the microfluidic system 100 is a Total Internal Reflection ("TIR") detector. FIGS. 14 and 14*a* illustrate forming an aperture 222 through the upper sheet 114 of the pouch 108 to permit establishing a TIR detector. The lower sheet 116 of the pouch 108 is clamped to a lower face 224 of a TIR prism 226. A ray 228 in FIG. 14 illustrates a typical path for light through the prism 226. However, light passing through the prism 226 along the ray 228 may interact with liquid contacting the face 224 of the prism 226. A groove 232 is etched locally in the lower sheet 116, a few microns deep, so as to provide a very thin capillary 126 for liquid. Such a configuration is ideal for TIR measurements since light penetrates at most a few wavelengths into the liquid filled groove 232. An O-ring 234 disposed in a trench 236 formed in the base plate 102 beneath the sheet 116 pushes the lower sheet 116 upward against the upper sheet 114, and against the face 224 of the prism 226, thereby making a liquid tight seal between the sheet 116 and the face 224. A segment of the etched groove 232 located between the O-ring 234 and the prism 226 is formed with a plurality of ribs 238, as illustrated in FIG. 14*b*, so compression of the sheets 114 and 116 by the O-ring 234 does not pinch off the groove 232. The ribs 238 allow liquid to enter the groove 232, but prevent sealing of the groove 232 by the O-ring 234. In operation then, the liquid flows across the face 224 of the prism 226 through the groove 232 formed in the lower sheet 116 while an instrument monitors changes the intensity between the light ray 228 entering the prism 226 and that which exits the prism 226. Because the liquid in the groove 232 contacts the prism 226, the face 224 of the prism 226 must be cleaned before each use.

FIG. 15 depicts integration of an electrophoresis capability into the microfluidic system 100 thereby facilitating analysis of reaction products. If the pouch 108 is made from polyimide, a copper pattern of electrophoretic electrodes 242 for a plurality of electrophoretic cells 244 may be readily sputtered, and thereby bonded, onto the sheets 114 or 116. The electrophoretic cells 244 may be unlaminated sections of sheets 42 and 44, or they may consist of grooves etched into one or both of the sheets 42 and 44. The electrophoretic electrodes 242, which are filled with electrophoretic gel 245, are established during lamination of the pouch 108 which forms the capillaries 126 and other pouch structures. If necessary, the copper electrophoretic electrodes 242 may have a protective overcoating of gold or any other inert metal.

Concurrent opening both of an inlet-valve 246 and of an outlet-valve 248 located at opposite ends of the capillary 126 permits a reaction's products to flow along the capillary 126 past open ends of the electrophoretic cells 244. While the reaction products are flowing along the capillary 126 past the open ends, an electric potential is applied across an elongated transfer electrode 252 and one of the electrophoretic electrodes 242 furthest from the transfer electrode 252 to load into the electrophoretic gel 245 at the open end of that electrophoretic cell 244 some of the reaction products. As illustrated in FIG. 15*a,* a layer 253 of electrical insulation separates the transfer electrode 252 from the electrophoretic electrodes 242 at the open end of each of the electrophoretic cells 244. After reaction products are loaded into the electrophoretic gel 245, the electric potential is removed and a purging flow of a preferably inert liquid flows along the capillary 126. After the capillary 126 has been purged, both the inlet-valve 246 and the outlet-valve 248 close thereby again sealing off all of the electrophoretic cells 244. At a later time, both the inlet-valve 246 and the outlet-valve 248 may again be opened thereby permitting different reaction products to flow along the capillary 126 and to be similarly loaded into a different one of the electrophoretic cells 244. This process of loading reaction products into an unused electrophoretic cell 244 and then purging the capillary 126 may repeat until all of the electrophoretic cells 244 have been loaded with reaction products. After the electrophoretic cells 244 have been loaded, an electric potential is applied across the electrophoretic electrodes 242 of all of the electrophoretic cells 244 to perform the conventional electrophoresis process.

As illustrated in FIG. 15, an electrophoresis-cell control-valve 254 may be positioned at the opening of one or more of the electrophoretic cells 244 thereby permitting mechanical isolation of each electrophoretic cell 244 from the capillary 126. FIG. 15*a* illustrates how laterally narrower edges 256 of the sheet 42 with respect edges 258 of the sheet 44 permits easily providing access for making electrical connections to the electrophoretic electrodes 242 and transfer electrode 252.

Although the present invention has been described in terms of the presently preferred embodiment, it is to be understood that such disclosure is purely illustrative and is not to be interpreted as limiting. For example, while polymeric sheet material is preferred for the malleable sheet 42 of the pouch 22 and/or, thin foils of metal and/or a metalized polymeric sheet material could be used instead. As is readily apparent, successfully laminating some of these alternative material system might require processes other than those described herein. Moreover, a microfluidic delivery system 20 or a microfluidic system 100 in accordance with the present invention need not use the preferred pair of sheets 42 and 44 or sheets 114 and 116 for the pouch 22 or pouch 108. Rather a microfluidic delivery system 20 or a microfluidic system 100 in accordance with the present invention need use only a single layer, sheet 42 or sheet 114 of malleable material for the pouch 22 or pouch 108, while the material of the sheet 44 or sheet 116 may be rigid, thereby perhaps avoiding any need for the base plate 24 or base plate 102. Analogously, while operation of the invention has been described for liquids, some configurations of the microfluidic delivery system 20 and the microfluidic system 100 described above may be used directly with any fluid, i.e. both liquids and gases, and other configurations of the microfluidic delivery system 20 and the microfluidic system 100 may be readily and easily adapted for use with liquids and gases. While for reasons of simplified control and power requirements piezo-electric actuators are preferred and, as described above electromagnetic actuators may alternatively be used, a microfluidic delivery system 20 or a microfluidic system 100 in accordance with the present invention may also employ either pneumatic or hydraulic actuators. While the registration pins 28 or registration pins 106 are particularly preferred for registering the pouch 22 or pouch 108 respectively with respect to the valve housing 32 or the valve plate 182, alternative means are practical for registering the valve housing 32 to the base plate 24 and the pouch 22 or the valve plate 182 to the base plate 102 and the pouch 108. For example, edges of the base plate 24 or the valve plate 182 could be juxtaposed with X and Y axis strips projecting upward from the anvil surface 26 or anvil surface 104. Alternatively, V-shaped grooves could be formed into the anvil surface 26 or anvil surface 104 to mate with curved surfaces projecting downward from the valve housing 32 or the valve plate 182. Preferably such alternative registration means should provide kinematic location of the valve housing 32 with restpect to the base plate 24, or of the valve plate 182 with respect to the base plate 102 that is not overdetermined. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A first microfluidic valve for controlling a flow of a fluid through an elongated capillary that is enclosed along at least one surface by a layer of a malleable material, the capillary having an inlet port and an outlet port, the microfluidic valve comprising:

a valve housing adapted to be pressed firmly against the layer of malleable material;

an actuator secured within said valve housing for producing movement toward or away from the layer of malleable material upon application of a control signal to the actuator; and a blade coupled to the actuator and shaped so that movement produced by the actuator toward the layer of malleable material presses the blade against the layer of malleable material thereby occluding the capillary and barring fluid from flowing from the inlet port to the outlet port, and whereby, upon retracting the blade away from the layer of malleable material, fluid introduced into the inlet port of the capillary may flow through the capillary to exit the capillary through the outlet port.

2. The microfluidic valve of claim 1 wherein the actuator includes a piezo-electric device arranged in an orientation in which increasing or decreasing an electric potential applied to the piezo-electric device produces the movement toward or away from the layer of malleable material.

3. The microfluidic valve of claim 1 further comprising a pouch that includes the capillary; at least a portion of the pouch, in addition to the surface of the capillary, being provided by a layer of malleable material that is shaped to provide a reservoir adapted for holding a quantity of fluid; the reservoir being in communication with the inlet port of the capillary so that upon application of pressure to the layer of malleable material of the reservoir fluid may flow from the reservoir into the capillary.

4. The microfluidic valve of claim 3 wherein the capillary includes:

a first segment of the capillary adjacent to the inlet port that has a small cross-sectional area; and a second segment of the capillary adjacent to the outlet port that has a cross-sectional area that is larger than the cross-sectional area of the first segment.

5. The microfluidic valve of claim 1 further comprising:

a base plate having a planar anvil surface and base-plate registration means; and a substantially planar, elongated, paddle-shaped nozzle that includes the capillary, said nozzle being adapted to be juxtaposed with the anvil surface of said base plate and interposed between the blade of said valve housing and the anvil surface, said nozzle including a nozzle registration means that mates with and engages the base-plate registration means, a short segment of the capillary intermediate the inlet port and the outlet port being disposed accurately between the blade and the anvil surface when the nozzle registration means mates with and engages the base-plate registration means.

6. The microfluidic valve of claim 5 further comprising a pouch that includes the nozzle; at least a portion of the pouch, in addition to the surface of the capillary, being provided by a layer of malleable material that is shaped to provide a reservoir adapted for holding a quantity of fluid; the reservoir being in communication with the inlet port of the capillary so that upon application of pressure to the layer of malleable material of the reservoir fluid may flow from the reservoir into the capillary.

7. A pouch adapted for use with a microfluidic valve that is adapted for controllably releasing a flow of a fluid from the pouch, the microfluidic valve including:

a base plate having a planar anvil surface and base-plate registration means; and a valve housing adapted to be mated with and urged toward the anvil surface of said base plate, said valve housing including an actuator that producing movement toward or away from the layer of malleable material upon application of a control signal to the actuator, said valve housing also including a blade coupled to the actuator and shaped so that movement of the actuator juxtaposes the blade with the anvil surface;

the pouch comprising:

a layer of malleable material having formed therein a reservoir that is adapted for holding a quantity of the fluid, said pouch including a substantially planar, elongated, paddle-shaped nozzle that projects outward from the reservoir and is adapted to be juxtaposed with the anvil surface of said base plate interposed between the blade of said valve housing and the anvil surface, the nozzle including a nozzle registration means that mates with and engages the base-plate registration means of said base plate, the nozzle also having an elongated capillary formed within the nozzle that communicates directly with the reservoir, the capillary being disposed accurately between the blade and the anvil surface when the nozzle registration means mates with and engages the base-plate registration means of said base plate, the capillary also including a outlet port opening distal from the reservoir, whereby, upon retracting the blade away from the anvil surface of said base plate, pressure applied to said pouch about the reservoir urges fluid in the reservoir to flow out of said pouch along the capillary and through the outlet port, and whereby extending the blade toward the anvil surface presses the malleable material of the nozzle together thereby occluding the capillary and barring fluid from flowing from said pouch along the capillary.

8. The pouch of claim 7 wherein the capillary includes:

a first segment of the capillary that extends outward from and that communicates directly with the reservoir, and that has a small cross-sectional area; and a short segment of the capillary that extends outward from and that communicates directly with the first segment, and that has a cross-sectional area that is larger than the cross-sectional area of the first segment.

9. A microfluidic system for controlling a flow of a fluid comprising:

a pouch having a capillary that is enclosed along at least one surface by a layer of a malleable material, the capillary having an inlet port and an outlet port, the layer of malleable material also being shaped to provide a processing chamber that is located along the capillary intermediate the inlet port and the outlet port;

a pair of valve housings adapted to be pressed firmly against the layer of malleable material, a first one of said valve housings being located intermediate said processing chamber and the inlet port of the capillary, a second one of said valve housings being located intermediate said processing chamber and the outlet port of the capillary;

a pair of actuators, one actuator being secured within each of said valve housings producing movement toward or away from the layer of malleable material upon application of a control signal to the actuator;

a pair of blades, each blade being coupled to one of said actuators, and each of said blades being shaped so movement of the actuator to which the blade is coupled toward the layer of malleable material juxtaposes such blade with the capillary and presses the blade against the layer of malleable material thereby occluding the capillary and barring the fluid from flowing through the capillary, and whereby, upon retracting the blade away from the layer of malleable material, fluid introduced into the capillary may flow through the capillary; and a piston having a face that is adapted for controllably depressing the malleable material of said pouch about said processing chamber, the face of said piston being juxtaposed with said processing chamber.

10. The microfluidic system of claim 9 wherein the face of said piston is knurled.

11. A microfluidic system for controlling flows of a fluid through a plurality of interconnected, elongated capillaries that are all enclosed along at least one surface by a layer of a malleable material, each capillary having an inlet port and an outlet port, the microfluidic system comprising:

a plurality of valve housings adapted to be pressed firmly against the layer of malleable material;

a plurality of actuators equal in number to the plurality of valve housings, each actuator being secured within one of said valve housings; and each of said actuators producing movement toward or away from the layer of malleable material upon application of a control signal to said actuator; and a plurality of blades equal in number to the plurality of valve housings and actuators, each blade being coupled to one of said actuators, and each of said blades being shaped so movement of the actuator to which the blade is coupled toward the layer of malleable material juxtaposes such blade with one of the capillaries and presses the blade against the layer of malleable material thereby occluding the capillary and barring the fluid from flowing from the inlet port to the outlet port, and whereby, upon retracting the blade away from the layer of malleable material, fluid introduced into the inlet port of the capillary may flow through the capillary to exit the capillary through the outlet port of the capillary.

12. The microfluidic system of claim 11 wherein at least one of the actuators includes a piezo-electric device arranged in an orientation in which increasing or decreasing an electric potential applied to the piezo-electric device produces the movement toward or away from the layer of malleable material.

13. The microfluidic system of claim 11 wherein said valve housings have profiles and at least one of said actuators includes a leaf spring coupled to said actuator, the leaf spring supporting said blade outside of the profile of the valve housing within which said actuator is secured.

14. The microfluidic system of claim 11 further comprising a pouch that includes the capillaries; at least a portion of the pouch, in addition to the surface of the capillaries, being provided by a layer of malleable material that is shaped to provide reservoirs each of which is adapted for holding a quantity of fluid; each reservoir being in communication with the inlet port of one of the capillaries so that upon application of pressure to the layer of malleable material of such reservoir fluid may flow from the reservoir into the capillary.

15. The microfluidic system of claim 14 wherein at least one of the capillaries includes:

a first segment of the capillary adjacent to the inlet port that has a small cross-sectional area; and a second segment of the capillary adjacent to the outlet port that has a cross-sectional area that is larger than the cross-sectional area of the first segment.

16. The microfluidic system of claim 14 wherein said pouch further comprises a reaction chamber.

17. The microfluidic system of claim 16 wherein said reaction chamber is an electrophoretic cell.

18. The microfluidic system of claim 14 wherein said pouch further comprises a heater.

19. The microfluidic system of claim 14 further comprising a valve plate to which said valve housings together with the associated actuators and blades are secured.

20. The microfluidic system of claim 19 further comprising a base plate having an anvil surface against which said pouch is juxtaposed, said base plate further comprising base-plate registration means, said pouch and said valve plate respectively having pouch registration means and valve-plate registration means that respectively mate with and engage the base-plate registration means.

21. The microfluidic system of claim 20 wherein ridges protrude outward from the anvil surface said base plate for limiting contact between the pouch and said valve plate and the valve housings carried by said valve plate to small areas about the valve housings.

22. The microfluidic system of claim 20 further comprising a heater secured within said base plate for heating a region of said pouch immediately adjacent to said heater.

23. The microfluidic system of claim 20 further comprising a cooler secured within said base plate for cooling a region of said pouch immediately adjacent to said heater.

24. The microfluidic system of claim 14 wherein:

a processing chamber is formed in the malleable material of said pouch along one of the capillaries intermediate the inlet port and the outlet port of that capillary; and a pair of said valve housings together with the associated actuators and blades are respectively located along the capillary on opposite sides of said processing chamber; a first one of said valve housings together with the associated actuator and blade being located intermediate said processing chamber and the inlet port of the capillary, and a second one of said valve housings together with the associated actuator and blade being located intermediate said processing chamber and the outlet port of the capillary; and the microfluidic system further comprising a piston having a face that is adapted for controllably depressing the malleable material of said pouch about said processing chamber, the face of said piston being juxtaposed with said processing chamber.

25. The microfluidic system of claim 24 wherein the face of said piston is knurled.

26. The microfluidic system of claim 14 wherein:

a pair of processing chamber are formed in the malleable material of said pouch along one of the capillaries intermediate the inlet port and the outlet port of that capillary; and a pair of said valve housings together with the associated actuators and blades are respectively located along the capillary on opposite sides of said pair of processing chamber; a first one of said valve housings together with the associated actuator and blade being located intermediate the inlet port of the capillary and said processing chamber nearest to the inlet port, and a second one of said valve housings together with the associated actuator and blade being located intermediate the outlet port of the capillary and said processing chamber nearest to the outlet port.

27. The microfluidic system of claim 26 further comprising a pair of pistons each having a face that is adapted for controllably depressing the malleable material of said pouch about one of said processing chambers, the face of said piston being juxtaposed with said processing chamber.

28. The microfluidic system of claim 26 wherein a third valve housing together with the associated actuator and blade are respectively located along the capillary between said pair of processing chambers.

29. The microfluidic system of claim 26 wherein said pouch further comprises a heater.

30. The microfluidic system of claim 14 wherein one of the capillaries has an ultraviolet ("UV") window formed in the malleable material.

31. The microfluidic system of claim 14 wherein the pouch includes a Total Internal Reflection ("TIR") detector disposed along one of the capillaries.

32. The microfluidic system of claim 14 further comprising means for applying pressure to at least one of the reservoirs.

* * * * *